US009665320B2

(12) United States Patent
Nishida

(10) Patent No.: US 9,665,320 B2
(45) Date of Patent: May 30, 2017

(54) INFORMATION PROCESSING SYSTEM AND INFORMATION PROCESSING METHOD FOR MANAGING DATA ACCORDING TO ADDRESS INFORMATION

(71) Applicant: Takayori Nishida, Tokyo (JP)

(72) Inventor: Takayori Nishida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/889,622

(22) PCT Filed: Apr. 23, 2014

(86) PCT No.: PCT/JP2014/062118
§ 371 (c)(1),
(2) Date: Nov. 6, 2015

(87) PCT Pub. No.: WO2014/181759
PCT Pub. Date: Nov. 13, 2014

(65) Prior Publication Data
US 2016/0098233 A1 Apr. 7, 2016

(30) Foreign Application Priority Data

May 10, 2013 (JP) ................................. 2013-099971

(51) Int. Cl.
*G06K 15/00* (2006.01)
*G06F 3/12* (2006.01)
*H04N 1/44* (2006.01)

(52) U.S. Cl.
CPC .......... *G06F 3/1222* (2013.01); *G06F 3/1204* (2013.01); *G06F 3/1238* (2013.01);
(Continued)

(58) Field of Classification Search
None
See application file for complete search history.

(56) References Cited

U.S. PATENT DOCUMENTS 8,760,729 B2 6/2014 Oseto et al.
9,001,348 B2 4/2015 Nishida
(Continued)

FOREIGN PATENT DOCUMENTS

JP 2001-051915 2/2001
JP 2002-51085 A 2/2002
(Continued)

OTHER PUBLICATIONS

International Search Report Issued on Aug. 19, 2014 in PCT/JP2014/062118 filed on Apr. 23, 2014.
(Continued)

*Primary Examiner* — Miya J Williams
(74) *Attorney, Agent, or Firm* — Oblon, McClelland, Maier & Neustadt, L.L.P.

(57) ABSTRACT

An information processing system includes one or more information processing apparatuses. The system receives, via a network, mail data including output data or output target data; and determines user identification information to be associated with the received output data or output data generated based on the received output target data from user information stored by using address information of a sender of the mail data or address information in transmission destinations of the mail data. When the user identification information is not determined from the address information of the sender but is determined from the address information in the transmission destinations, the system associates data identification information with the output data and stores them; notifies of the data identification information via a network; and transmits, via a network, the output data associated with the user identification information or the data identification information received via a network.

18 Claims, 26 Drawing Sheets

(52) U.S. Cl.
CPC .......... *G06F 3/1267* (2013.01); *G06F 3/1288* (2013.01); *H04N 1/4413* (2013.01)

(56) References Cited

U.S. PATENT DOCUMENTS

| | | | |
|---|---|---|---|
| 2002/0051183 A1* | 5/2002 | Tsukui | H04N 1/00209 358/1.15 |
| 2003/0067624 A1* | 4/2003 | Anderson | G06F 3/1204 358/1.15 |
| 2004/0001226 A1 | 1/2004 | Ohtuka | |
| 2007/0047006 A1* | 3/2007 | Sakai | G06F 3/1207 358/400 |
| 2009/0122334 A1 | 5/2009 | Soneoka | |
| 2012/0268770 A1 | 10/2012 | Fukuda | |
| 2013/0094053 A1* | 4/2013 | Shirai | G06F 3/1222 358/1.15 |
| 2014/0337445 A1 | 11/2014 | Nishida | |

FOREIGN PATENT DOCUMENTS

| | | |
|---|---|---|
| JP | 2004-088726 | 3/2004 |
| JP | 2004-236348 | 8/2004 |
| JP | 2009-187382 A | 8/2009 |
| JP | 2012-224000 | 11/2012 |
| JP | 2012-248006 | 12/2012 |
| JP | 2014-016979 | 1/2014 |
| JP | 2014-219893 | 11/2014 |
| JP | 2014-219894 | 11/2014 |
| WO | 2014/181884 A1 | 11/2014 |

OTHER PUBLICATIONS

Extended European Search Report issued on May 2, 2016 in Patent Application No. 14794997.8.
Office Action issued on Apr. 25, 2016 in Canadian Patent Application No. 2,910,276.

* cited by examiner

FIG.6

| USER NAME | PASSWORD | MAIL ADDRESS | ..... |
|---|---|---|---|
| A | ..... | aaa@xxxxx | ..... |
| B | ..... | bbb@xxxxx | ..... |
| .. | .. | .. | .. |

| JOB NAME | USER MODE | USER NAME | PIN CODE | PRINT DATA | ... |
|---|---|---|---|---|---|
| XXX | G | A | 1234 | ... | ... |
| YYY | U | A | .. | ... | ... |
| .. | .. | .. | .. | .. | .. |

| COMPANY CODE | RECEIVING ADDRESS |
|---|---|
| COMPANY 1 | office1@cloud.co.jp |
| COMPANY 2 | office2@cloud.co.jp |
| COMPANY 3 | office3@cloud.co.jp |
| : | : |

| JOB NAME | USER MODE | USER NAME | PIN CODE | PRINT DATA | COMPANY CODE | ... |
|---|---|---|---|---|---|---|
| XXX | G | A | 1234 | ... | COMPANY 1 | ... |
| ZZZ | U | B | | ... | COMPANY 2 | ... |
| .. | .. | .. | .. | .. | .. | .. |

| COMPANY CODE | APPARATUS ID |
|---|---|
| COMPANY 1 | ... |
| COMPANY 1 | ... |
| : | : |
| COMPANY 2 | ... |
| : | : |

FIG.19

| ORGANIZATION CODE | USER NAME | PASSWORD | MAIL ADDRESS | ROLE | 733 |
|---|---|---|---|---|---|
| COMPANY 1 | A | ••••• | aaa@xxxxx | ADMINISTRATOR | ••••• |
| | B | ••••• | bbb@xxxxx | USER | ••••• |
| COMPANY 2 | •• | •• | •• | •• | •• |

| ORGANIZATION CODE | PIN CODE | USER NAME |
|---|---|---|
| XXX | 100 | A |
| YYY | 101 | ... |
| YYY | 102 | ... |
| XXX | 103 | ... |

FIG.27

| ORGANIZATION CODE | USER NAME | PASSWORD |
|---|---|---|
| XXX | A | ... |
| YYY | B | ... |

INFORMATION PROCESSING SYSTEM AND INFORMATION PROCESSING METHOD FOR MANAGING DATA ACCORDING TO ADDRESS INFORMATION

TECHNICAL FIELD

The present invention relates to an information processing system, an information processing method and a non-transitory computer readable information recording medium.

BACKGROUND ART

In the related art, there is a system in which, in response to a print instruction that is input into a Personal Computer (PC) or the like by a user, instead of print data being printed immediately, the print data is associated with the user name and is stored in a storage device of a predetermined server or image forming apparatus. Then, when the user inputs the user name and a password through an operation panel of the image forming apparatus, the image forming apparatus carries out authentication using the user name and the password. When the authentication is successful, the image forming apparatus displays, on the operation panel, list information including print data associated with the user name from among print data stored in the storage device. The image forming apparatus obtains, from the storage device, print data that is selected from the list information and carries out printing.

By this system, printed matter is output when the user is beside the image forming apparatus. Therefore, it is possible to prevent the printed matter from being left as it is on the image forming apparatus or taken by another person. As a result, it is possible to ensure security of the printed information.

SUMMARY OF INVENTION

According to one aspect, an information processing system includes one or more information processing apparatuses. The information processing system includes an output data reception part that receives, via a network, mail data including output data or output target data; a determination part that determines user identification information to be associated with the received output data or output data generated based on the received output target data from user information stored by a user information storage part by using address information of a sender of the mail data or address information included in transmission destinations of the mail data; a storage process part that associates data identification information with the output data and stores them in a data storage part when the user identification information to be associated is not determined from the address information of the sender but is determined from the address information included in the transmission destinations; a notification part that sends notification of the data identification information via a network; and a transmission part that transmits, via a network, the output data associated with the user identification information or the data identification information received via a network.

Other objects, features and advantages of the present invention will become more apparent from the following detailed description when read in conjunction with the accompanying drawings.

BRIEF DESCRIPTION OF DRAWINGS

FIG. 6 shows a configuration example of a user information storage part;

FIG. 7 shows a configuration example of a print information storage part according to the first embodiment;

FIG. 12 shows a configuration example of an address associated information storage part;

FIG. 13 shows a configuration example of a print information storage part according to the second embodiment;

FIG. 14 shows a configuration example of a user apparatus information storage part;

FIG. 19 shows a configuration example of a user information storage part according to the fourth embodiment;

FIG. 27 shows a configuration example of a proxy account management table; and

DESCRIPTION OF EMBODIMENTS

First, for the sake of convenience of explanation, a problem to be solved by the embodiments of the present invention will be described.

In the above-mentioned system in the related art, only a user who previously has his or her account for receiving authentication can carry out printing. Therefore, for example, a visitor or the like who does not have such an account requests a person who has such an account to carry out printing. Thus, inconvenience may occur. There can be a way of providing a common guest account to the visitor or the like. However, in this way, since the common guest account is given to a plurality of visitors, one visitor can manipulate print data of another visitor. As a result, the above-mentioned advantage obtained from the system of ensuring security of printed information may be degraded.

Further, there can be another way by providing an image forming apparatus for guests. However, in this way, an economic burden increases and extra installation space is necessary. Therefore, it may be difficult to say this way is excellent.

The embodiments of the present invention have been devised in consideration of the point and an objective of the embodiments is to make it possible to give output authorization for a user who does not have an account for outputting data.

Figure 1:
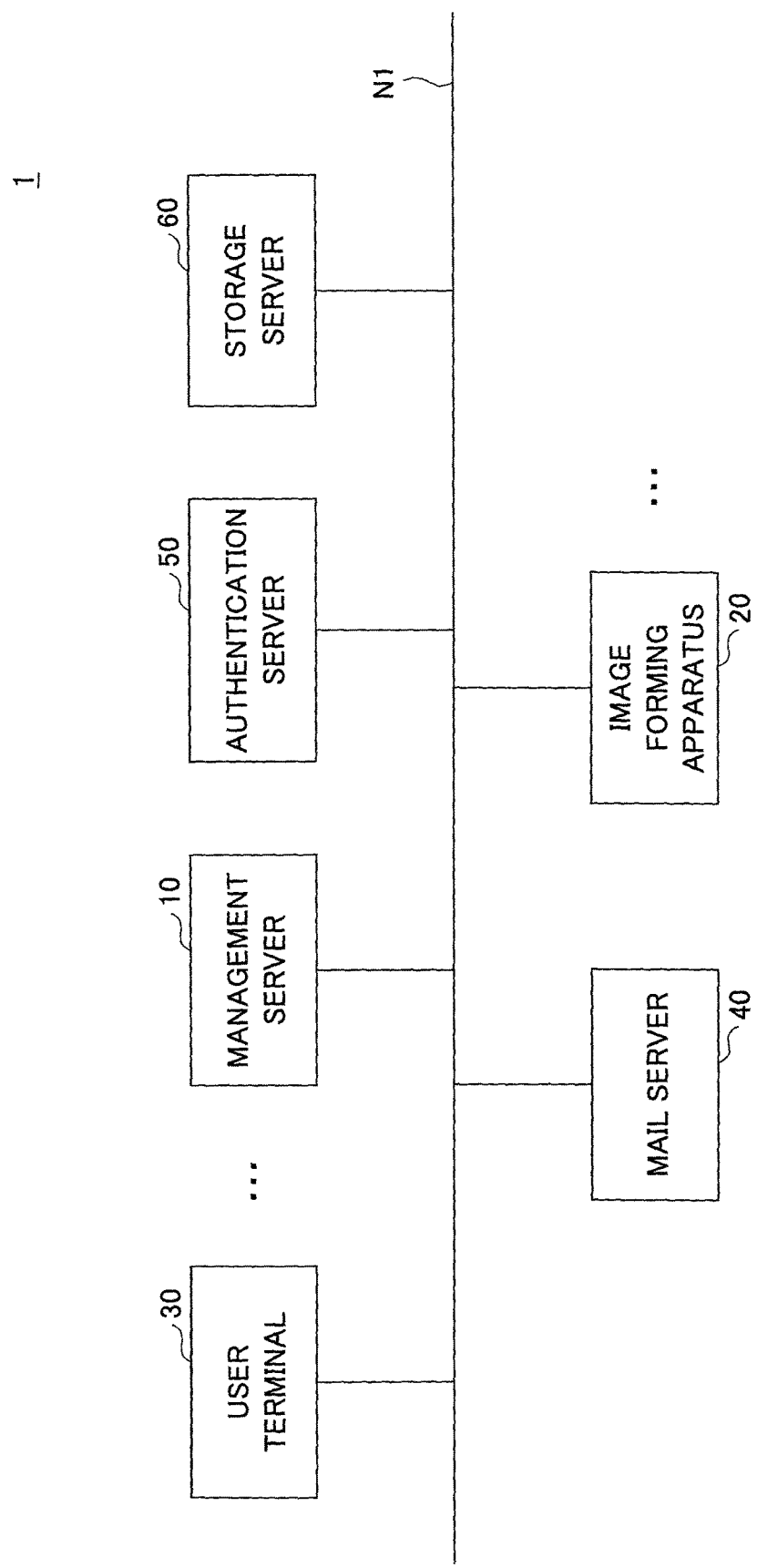
FIG. 1 shows a configuration example of a print system according to a first embodiment.

Below, based on the drawings, the embodiments of the present invention will be described. FIG. 1 shows a configuration example of a print system according to the first embodiment. In a print system 1 shown in FIG. 1, one or more user terminals 30, a mail server 40, a management server 10, an authentication server 50, a storage server 60 and one or more image forming apparatuses 20 are connected together via a network N1 such as a Local Area Network (LAN) or the Internet in a manner of implementing mutual communication. A part or the entire network N1 can be a wireless communication network. Between the user terminals 30 and the network N1, a mobile communication network can be inserted. It is assumed that the print system 1 is operated in an organization of a company or the like. According to the first embodiment, the organization will be referred to as a "company A".

The user terminals 30 are information processing apparatuses directly operated by corresponding users of the print system 1. For example, the user operates the user terminals 30 and inputs a print request for the print system 1. Examples of the user terminals 30 can be PCs, portable phones, smartphones, tablet-type terminals, Personal Digital Assistances (PDAs) and so forth. The respective ones of the plurality of user terminals 30 can be those of mutually different types.

Note that according to the first embodiment, the users of the print system 1 include "authorized users" and "guest users". The authorized users are users whose information is registered in the print system 1 (strictly speaking, in a user information storage part 52, described later). In other words, the authorized users are users who are expected as users of the print system 1. Examples of the authorized users can be employees of the company A. The guest users are users whose information is not registered in the print system 1. In other words, the guest users originally have no use authorization for the print system 1. Examples of the guest users can be persons other than the employees of the company A.

The mail server 40 is a computer that transfers electronic mails transmitted from the user terminals 30, electronic mails transmitted from the management server 10 and so forth. For example, the user terminal 30 transmits, according to a users' instruction, an electronic mail including a print request for the management server 10. Electronic data to be printed is attached to the electronic mail that includes the print request. The data format of the electronic data is not limited to be a predetermined one. Below, an electronic mail including a print request transmitted from the user terminal 30 will be referred to as a "print request mail", hereinafter.

The authentication server 50 is a computer that manages information for each of the users (hereinafter, referred to as "user information") of the company A and carries out a process using the user information. For example, the authentication server 50 carries out an authentication process in response to an authentication request in which a user name, a password and/or the like are designated. Further, the authentication server 50 carries out processes in response to a presence confirmation request for a mail address and a request for obtaining a user name corresponding to a mail address. That is, the user information includes mail addresses of users in a manner of being associated with the user names.

The management server 10 is a computer that, in response to receiving a print request mail, carries out a process of generating "print data" from electronic data included in the print request mail, and so forth. Print data has such a data format that the image forming apparatuses 20 can interpret the print data. The management server 10 associates the generated print data with the user name of the user of the transmission source (sender) of the print request mail or an "identifier" generated for each print request mail, and transmits it to the storage server 60. When the transmission source address of the print request mail is associated with the user name and is managed by the authentication server 50, the user name is to be associated with the print data. When the condition where the transmission source address of the print request mail is associated with the user name and is managed by the authentication server 50 is not satisfied, the print data is to be associated with an "identifier" generated for each print request mail. Hereinafter, such an "identifier" will be referred to as a "Personal Identification Number (PIN) code".

The storage server 60 is a computer that stores print data transmitted from the management server 10.

Each image forming apparatus 20 is an apparatus that carries out printing of print data from among print data stored in the storage server 60 associated with a user name or a PIN code that is input by a user in the image forming apparatus 20.

Figure 2:
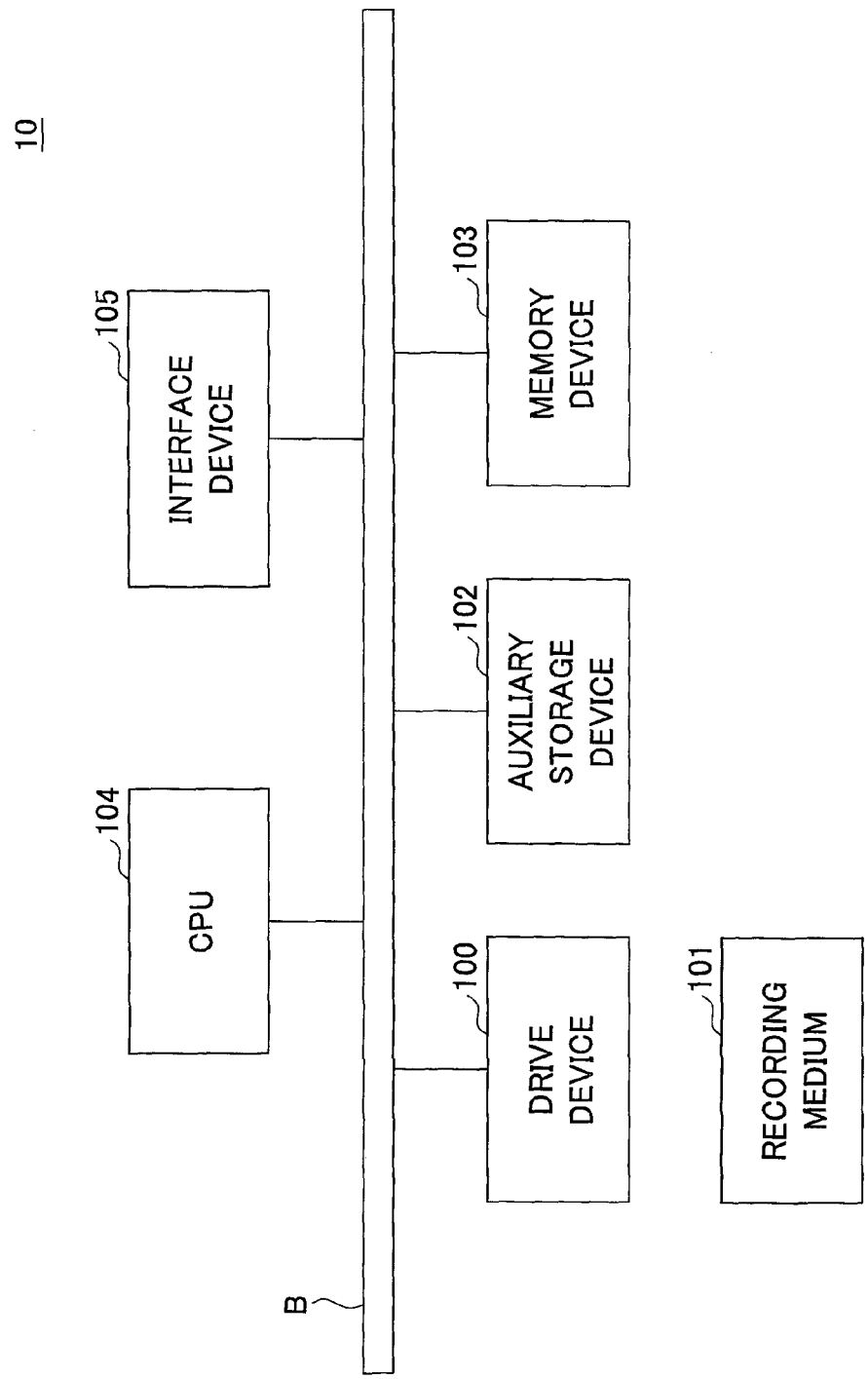
FIG. 2 shows a hardware configuration example of a management server according to the first embodiment.

FIG. 2 shows a hardware configuration example of the management server according to the first embodiment. The management server 10 in FIG. 2 includes a drive device 100, an auxiliary storage device 102, a memory device 103, a CPU 104, an interface device 105 and so forth mutually connected by a bus B.

A program that implements processes in the management server 10 is provided by a recording medium 101 such as a CD-ROM. When the recording medium 101 storing the program is set in the drive device 100, the program is installed from the recording medium 101 in the auxiliary storage device 102 through the drive device 100. However, the program needs not be installed from the recording medium 101 and can be downloaded from another computer via a network. The auxiliary storage device 102 stores the installed program and also necessary files and data.

When an instruction to start the program is given, the memory device 103 reads the program from the auxiliary storage device 102 and stores it. The CPU 104 carries out functions concerning the management server 10 according to the program stored in the memory device 103. The interface device 105 is used as an interface for connecting with a network.

Figure 3:
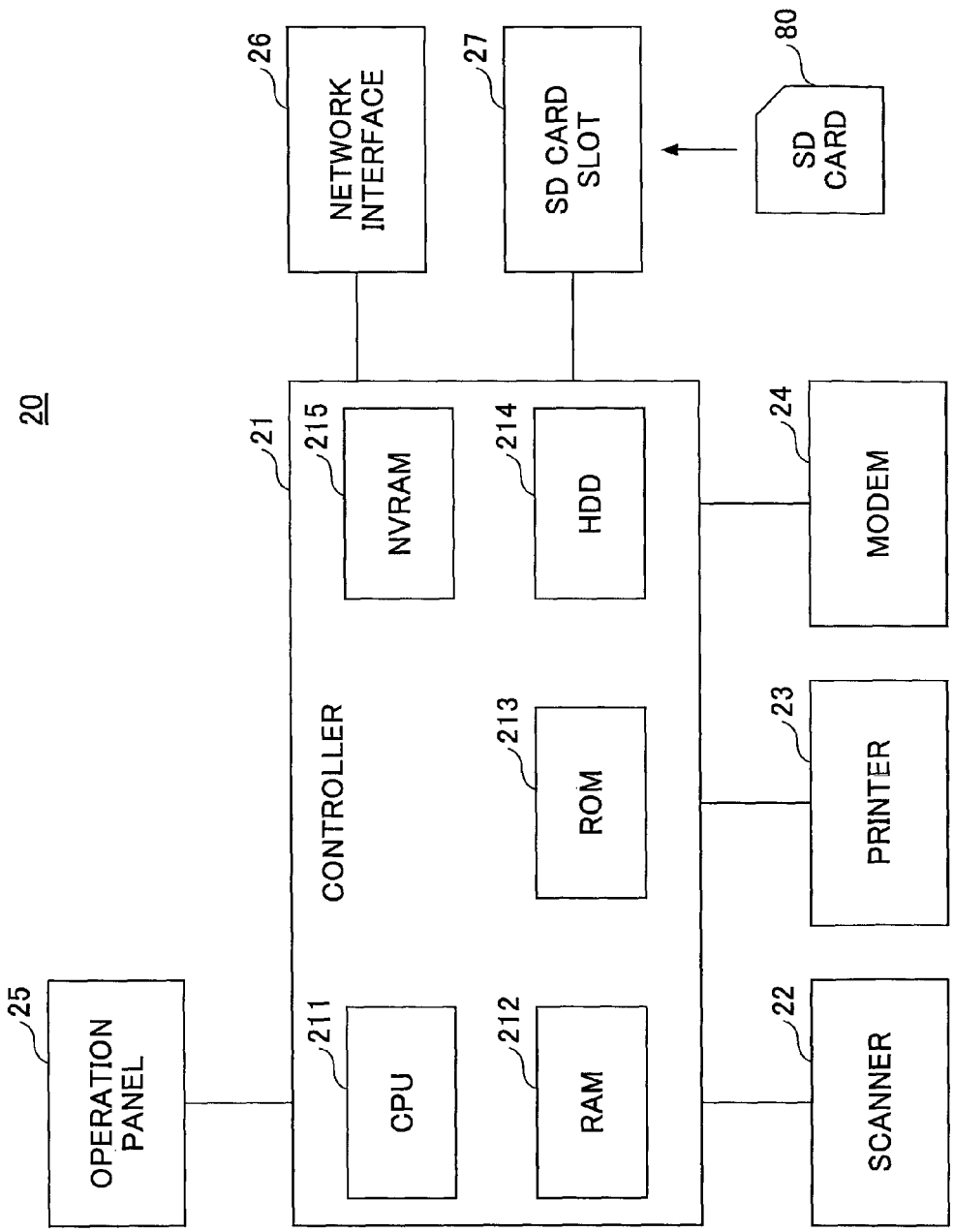
FIG. 3 shows a hardware configuration example of an image forming apparatus according to the first embodiment.

FIG. 3 shows a hardware configuration example of the image forming apparatus according to the first embodiment. In FIG. 3, the image forming apparatus 20 has hardware such as a controller 21, a scanner 22, a printer 23, a modem 24, an operation panel 25, a network interface 26, a SD slot card slot 27 and so forth.

The controller 21 includes a CPU 211, a RAM 212, a ROM 213, a HDD 214, a NVRAM 215 and so forth. The ROM 213 stores various programs, data used by a program and so forth. The RAM 212 is used as a storage area for loading a program, a work area for a loaded program and so forth. The CPU 211 executes a program loaded in the RAM 212 and implements various functions. The HDD 214 stores programs, various data used by programs and so forth. The NVRAM 215 stores various setting information.

The scanner 22 is hardware (image reading part) for reading image data from an original. The printer 23 is hardware (printing part) for printing print data on a sheet of paper. The modem 24 is hardware for connecting with a telephone line and is used for transmitting/receiving image data through facsimile communication. The operation panel 25 is hardware such as an input part such as buttons or the like for receiving an input from a user, a display part such as a liquid crystal panel and so forth. The liquid crystal panel can have a touch panel function. In this case, the liquid crystal panel includes also a function of the input part. The network interface 26 is hardware for connecting with a network such as a LAN or the like (that can be of wired or wireless). The SD card slot 27 is used for reading a program stored in a SD card 80. That is, in the image forming apparatus 20, not only a program stored in the ROM 213 but also a program stored in the SD card 80 can be loaded in the RAM 212 and can be executed. Note that it is also possible to use another recording medium (for example, a CD-ROM, a Universal Serial Bus (USB) memory or the like) instead of the SD card 80. That is, a type of such a recording medium to be used instead of the SD card 80 is not limited to a predetermined one. In this case, the SD card slot 27 can be replaced by hardware corresponding to the type of the recording medium to be used instead.

Note that according to the first embodiment, the image forming apparatus 20 needs not include the scanner 22 and the modem 24. In other words, the image forming apparatus 20 can also be a printer instead of a multifunction peripheral.

Figure 4:
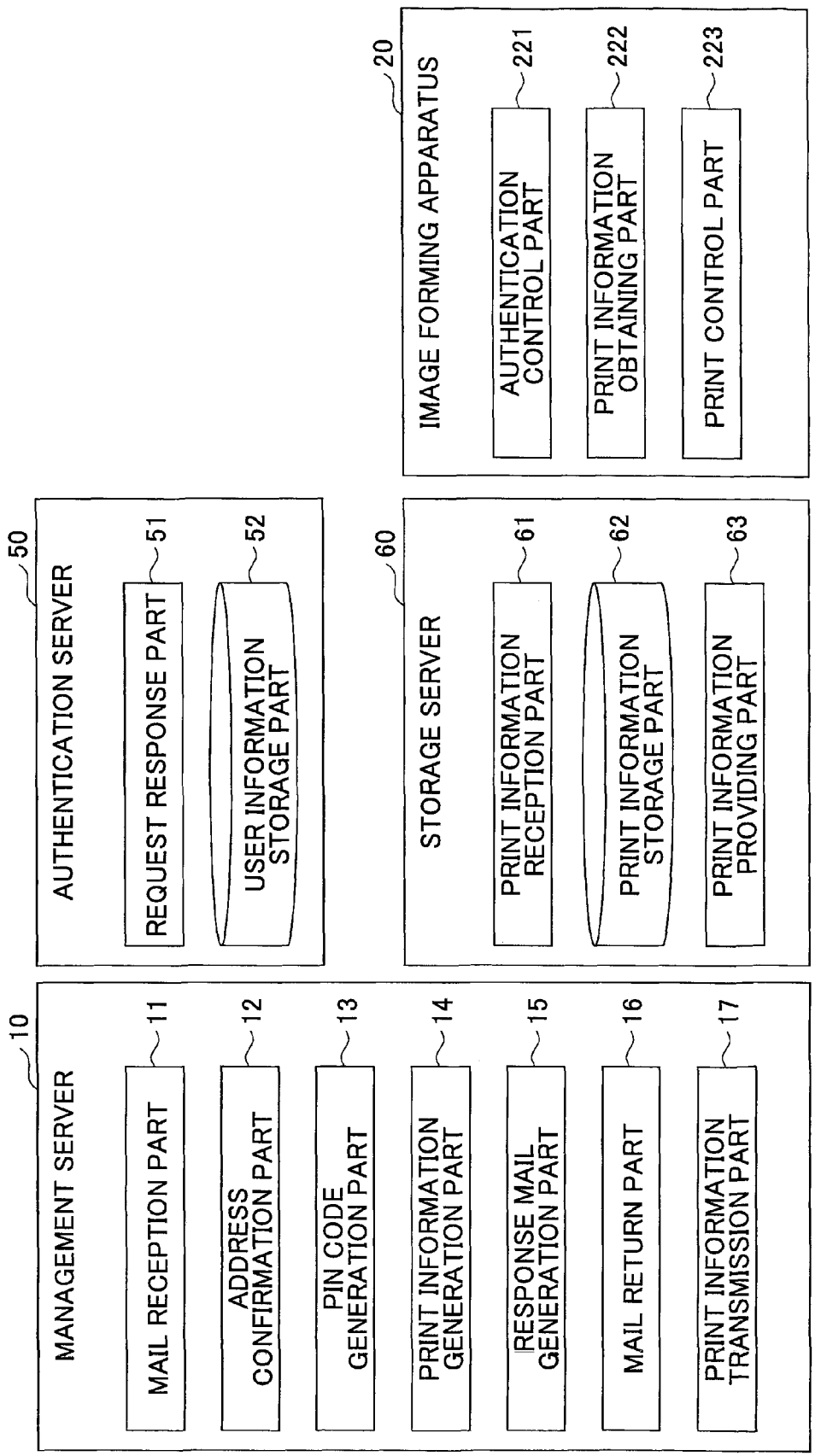
FIG. 4 shows a functional configuration example of the print system according to the first embodiment.

FIG. 4 shows a functional configuration example of the print system according to the first embodiment. In FIG. 4, the management server 10 includes a mail reception part 11, an address confirmation part 12, a PIN code generation part 13, a print information generation part 14, a response mail generation part 15, a mail return part 16, a print information transmission part 17 and so forth. These parts are implemented by processes carried out by the CPU 104 according to one or more programs installed in the management server 10.

The mail reception part 11 receives a print request mail. A print request mail includes print target data that a user wishes to print (for example, a mail body, an attached file or the like). For example, a user transmits a mail including print target data from the user terminal 30 for a mail address (destination) in a specific domain. The mail reception part 11 determines that a received mail is a print request mail by receiving the mail in which the specific domain is set as its destination.

The address confirmation part 12 transmits a presence confirmation request concerning the transmission source of a print request mail to the authentication server 50 and queries the authentication server 50 whether the transmission source address is registered in the authentication server 50. When the transmission source address is registered in the authentication server 50, the address confirmation part 12 obtains the user name corresponding to the transmission source address from the authentication server 50. When the transmission source address is not registered in the authentication server 50, the PIN code generation part 13 generates a PIN code. The print information generation part 14 generates "print information" corresponding to a print request mail. "Print information" includes print data, information concerning a print job of the print data, also a user name or a PIN code, and so forth.

The response mail generation part 15 generates an electronic mail (hereinafter, referred to as a "response mail") as a response to a print request mail. A response mail includes identification information of a print job based on each print data. The response mail also includes a PIN code when the PIN code is generated concerning the print request mail.

The mail return part 16 returns a response mail to the transmission source address of a print request mail. The print information transmission part 17 transmits print information to the storage server 60 and stores the print information in the storage server 60.

The authentication server 50 includes a request response part 51, a user information storage part 52 and so forth. The user information storage part 52 stores user information for each authorized user. The request response part 51 carries out processes in response to an authentication request, a presence confirmation request for a mail address, a request to obtain a user name corresponding to a mail address and so forth. Note that the request response part 51 is implemented by a process carried out by a CPU of the authentication server 50 according to a program installed in the authentication server 50. The user information storage part 52 can be implemented by using an auxiliary storage device of the authentication server 50 or a storage device connected with the authentication server 50 via a network.

The storage server 60 includes a print information reception part 61, a print information storage part 62, a print information providing part 63 and so forth. The print information reception part 61 receives print information transmitted from the management server 10 and stores it in the print information storage art 62. In response to a request to obtain print information sent from the image forming apparatus 20, the print information providing part 63 returns, to the image forming apparatus 20, print information including a user name or a PIN code designated in the request to obtain print information from among print information stored in the print information storage part 62.

Note that the print information reception part 61 and the print information providing part 63 are implemented by processes carried out by a CPU of the storage server 60 according to one or more program installed in the storage server 60. The print information storage part 62 can be implemented using an auxiliary storage device of the storage server 60, a storage device connected with the storage server 60 via a network or the like.

The image forming apparatus 20 includes an authentication control part 221, a print information obtaining part 222, a print control part 223 and so forth. These parts are implemented by processes carried out by the CPU 211 according to one or more programs installed in the image forming apparatus 20. The authentication control part 221 receives, from a user, "a user name and a password" or "a PIN code". When a user name and a password are input, the authentication control part 221 requests the authentication server 50 to carry out authentication using the user name and the password. The print information obtaining part 222 transmits a request to obtain print information to the storage server 60. At least one of a user name and a PIN code received by the authentication control part 221 is designated in the request to obtain print information. The print control part 223 carries out a print process concerning print data obtained by the print information obtaining part 222.

Figure 5:
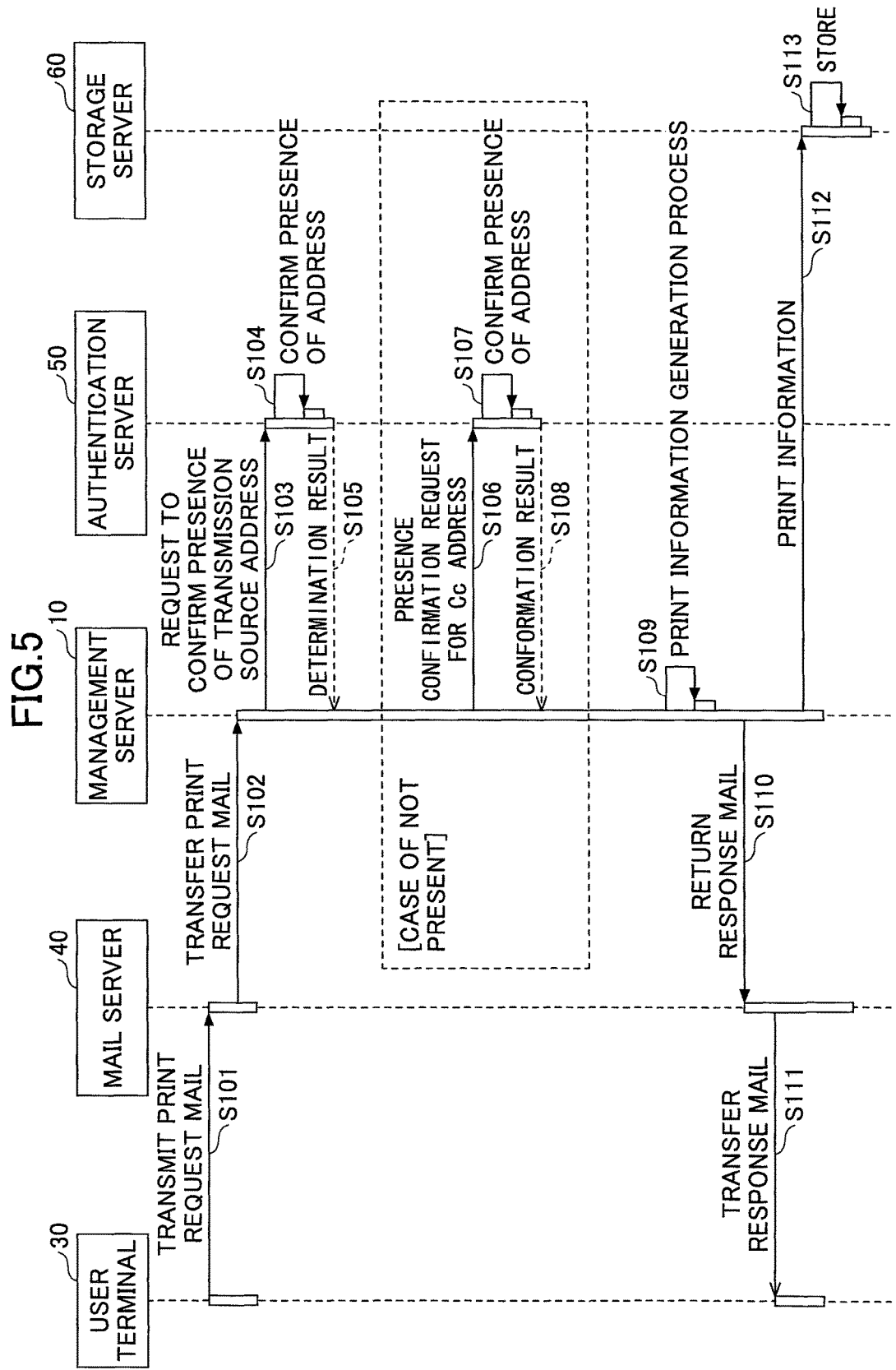
FIG. 5 is a sequence diagram illustrating one example of a procedure of storing print data according to the first embodiment.

Below, procedures carried out in the print system 1 will be described. FIG. 5 is a sequence diagram illustrating one example of a procedure of storing print data according to the first embodiment.

In step S101, in response to an instruction that is input by a user, the user terminal 30 transmits a print request mail for a "predetermined mail address". Electronic data to be printed is attached to the print request mail. The predetermined mail address is, for example, a mail address previously determined as a mail address for the management server 10.

However, when a user is a guest user, the guest user designates the mail address of any authorized user as a destination for Carbon copy (Cc). Hereinafter, a mail address designated as a destination for Cc will be referred to as a "Cc address".

As one example of a mail address designated as a Cc address, a mail address of an authorized user belonging to a division which bears the cost of printing requested out by a user can be cited. For example, a case can be considered where a user needs to print a material for the purpose of a meeting with an authorized user "a" belonging to the division and designates a mail address of the authorized user "a" as a Cc address after receiving a permission of the authorized user "a".

The mail server 40 transfers the print request mail for the management server 10 according to a common communication protocol for transferring electronic mails (S102). When a Cc address is designated in the print request mail, the mail server 40 transfers the print request mail for the Cc address. As a result, the authorized user whose mail address is designated as the Cc address of the print request mail can know a presence of a person who will carry out printing using the mail address of the authorized user. Therefore, if an authorized user's mail address is used without permission, the authorized user can know this fact.

The print request mail is received by the mail reception part 11 in the management server 10. In response to the reception of the print request mail, the address confirmation part 12 in the management server 10 designates the transmission source address of the print request mail and transmits a presence confirmation request for the mail address to the authentication server 50 (S103).

In response to a reception of the presence confirmation request, the request response part 51 in the authentication server 50 determines whether the mail address designated in the presence confirmation request is stored in the user information storage part 52 (S104).

FIG. 6 shows a configuration example of the user information storage part. In FIG. 6, the user information storage part 52 stores user information for each authorized user of the company A. The user information includes, for example, user names, passwords, mail addresses and so forth. It is also possible to register, for each single user, a plurality of mail addresses such as those for a PC, a portable terminal and so forth.

In step S104, the request response part 51 determines whether the same mail address as the mail address designated in the presence confirmation request is included as the mail address of any user information stored in the user information storage part 52.

Next, the request response part 51 returns a response including the determination result to the management server 10 (S105). The determination result is information indicating whether the same mail address is present. The address confirmation part 12 receives the determination result.

When the determination result indicates that the same mail address is not present and a Cc address is designated in the print request mail, the address confirmation part 12 designates the Cc address and transmits a presence confirmation request for the mail address (Cc address) to the authentication server 50 (S106).

In response to reception of the presence confirmation request, the request response part 51 in the authentication server 50 determines, in the same manner as step S104, whether the same address as the mail address (Cc address) designated in the presence confirmation request is stored in the user information storage part 52 (S107). Next, the request response part 51 returns a response including the determination result to the management server 10 (S108). The determination result includes, for example, a user name corresponding to the Cc address.

In response to reception of the determination result of step S105 or S108, the management server 10 carries out a process of generating print information (print information generation process) concerning the print request mail (S109). Next, the mail return part 16 in the management server 10 returns a response mail for the print request mail to the transmission source address of the print request mail (S110). The response mail is transferred to the user terminal 30 which is the transmission source of the print request mail by the mail server (S111). Note that the response mail is generated in the print information generation process.

On the other hand, after returning the response mail, the print information transmission part 17 in the management server 10 transmits the print information including the print data generated in the print information generation process, information associated with the print data and so forth to the storage server 60 (S112).

When receiving the print information, the print information reception part 61 in the storage server 60 stores the print information in the print information storage part 62 (S113).

FIG. 7 shows a configuration example of the print information storage part according to the first embodiment. In FIG. 7, the print information storage part 62 stores print information for each print data. Print information includes a job name, a user mode, print data, a user name or a PIN code, and so forth.

A job name is identification information for each print data or for each print job which is executed for each print data. A user mode is information indicating whether the transmission source address of a print request mail is managed in the user information storage part 52. According to the present embodiment, a user mode indicates whether a user who requests printing is an authorized user or a guest user. "U" represents an authorized user and "G" represents a guest user. A user name is the user name of a user who has a responsibility concerning a print job based on print information. A user who has a responsibility means, for example, a user who bears the cost concerning the print job (however, an actual part that bears the cost can be a division or the like to which the user belongs). A PIN code is a PIN code assigned to a user when the user who requests printing is a guest user.

Figure 8:
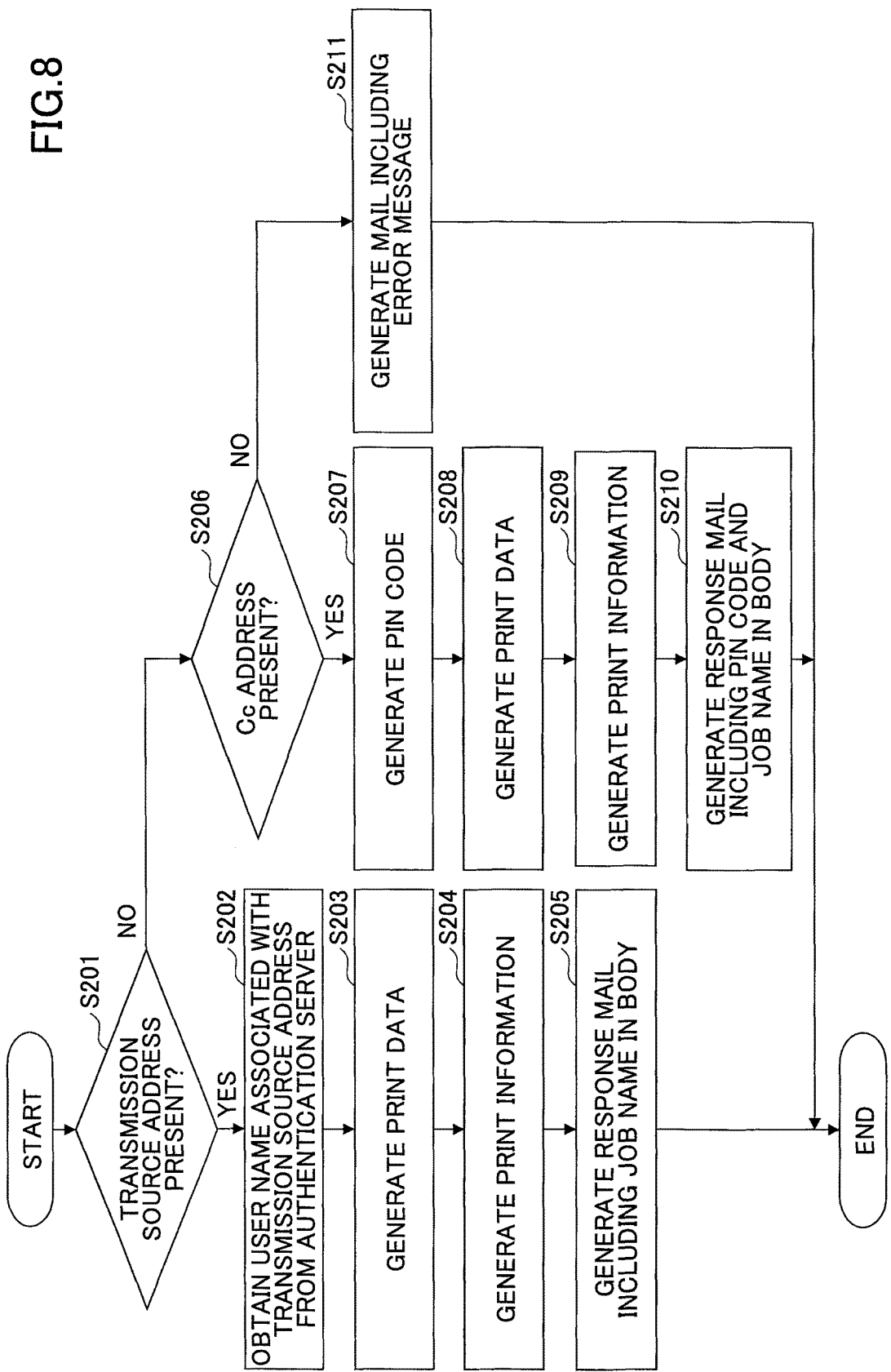
FIG. 8 is a flowchart illustrating one example of a procedure of a print information generation process according to the first embodiment.

Next, details of step S109 will be described. FIG. 8 is a flowchart illustrating one example of a procedure of a print information generation process according to the first embodiment.

When the determination result received in step S105 of FIG. 5 indicates a presence of the same address as the transmission source address of the print request mail (YES in S201), the address confirmation part 12 obtains the user name corresponding to the transmission source address from the authentication server 50 (S202). That is, the user name associated with the transition source address in the user information storage part 52 is obtained.

Next, the print information generation part 14 generates print data of the body of the print request mail and print data of the attached electronic data (print target data) (S203). However, only the attached electronic data is used to generate print data. Further, when the electronic data has a library file format such as a zip format including a plurality of files, the print information generation part 14 decompresses the electronic data, and generates print data for each file obtained from the decompression. Therefore, a plurality of sets of print data (print jobs) can be generated from a single print request mail.

Next, the print information generation part 14 generates print information for each set of print data (S204). That is, for each set of print data, a job name is generated, and each set of print data is included in the corresponding set of print information. "U" is set as a user mode in each set of print information. Further, in each set of print information, the user name obtained in step S202 is set. The generated print information is transmitted to the storage server 60 in step S112.

Next, the response mail generation part 15 generates a response mail in which the job name of each set of print information is written in, for example, its body (S205). The response mail is transferred to the user terminal 30 that is the transmission source of the print request mail in step S110 and S111 of FIG. 5. By reading the response mail, the user can know the job name corresponding to each set of print data generated for the print request mail. However, when the transmission source address is present in the user information storage part 52, it is possible to omit returning a response mail. For example, when a job name is generated based on the file name of the electronic data or the like, the user can know the contents of print data corresponding to each job name when the image forming apparatus 20 is operated, as will be described.

On the other hand, when the determination result received in step S105 of FIG. 5 indicates absence of the same address as the transmission source address of the print request mail (NO in S201) and the determination result received in step S108 indicates presence of the same address as the Cc address (YES in S206), steps S207 to S210 are then executed.

In step S207, the PIN code generation part 13 generates a PIN code for each print request mail. A PIN code can be generated by any method as long as the PIN code has a different value for each print request mail. However, it is preferable that a PIN code is made of letters, a number or the like that can be easily input through the operation panel 25 or through a software keyboard displayed the operation panel 25 of the image forming apparatus 20.

Next, the print information generation part 14 generates print data of the body of the print request mail and print data of the attached electronic data (print target data) (S208). The process contents of step S208 can be the same as step S203.

Next, the print information generation part 14 generates a set of print information for each set of print data (S209). That is, for each set of print data, a job name is generated and is included in the set of print information. "G" is set as a user mode of each set of print information. Further, the user name included in the determination result in step S108 of FIG. 5, the PIN code generated in step S207 and so forth are set in each set of print information. The thus generated print information is transmitted to the storage server 60 in step S112 of FIG. 5.

Next, the response mail generation part 15 generates a response mail in which the PIN code as well as the job name of each set of print information are written in, for example, its body (S210). The response mail is transferred to the user terminal 31 as the transmission source of the print, request mail in steps S110 and S111 of FIG. 5. By reading the response mail, the user can know the PIN code that is to be input in the image forming apparatus 20 when printing the print data generated in response to the print request mail. Further, the user can know the job name corresponding to each set of print data. However, it is possible to omit the job names from the response mail.

Note that when neither the same address as the transmission source address nor the same address as the Cc address is present, or no transmission source address is present and also no Cc address is designated (NO in S206), the response mail generation part 15 generates, for example, a response mail including an error message (hereinafter, referred to as an "error mail") (S211). In this case, an error mail is returned in step S110. Further, in this case, no print information is generated. Therefore, steps S112 and S113 are not executed. That is, the user cannot carry out printing.

When receiving a response message other than an error mail, the user goes to a place at which the image forming apparatus 20 is installed and operates the image forming apparatus 20. Next, a procedure carried out by the image forming apparatus 20 in response to the user's operation will be described.

Figure 9:
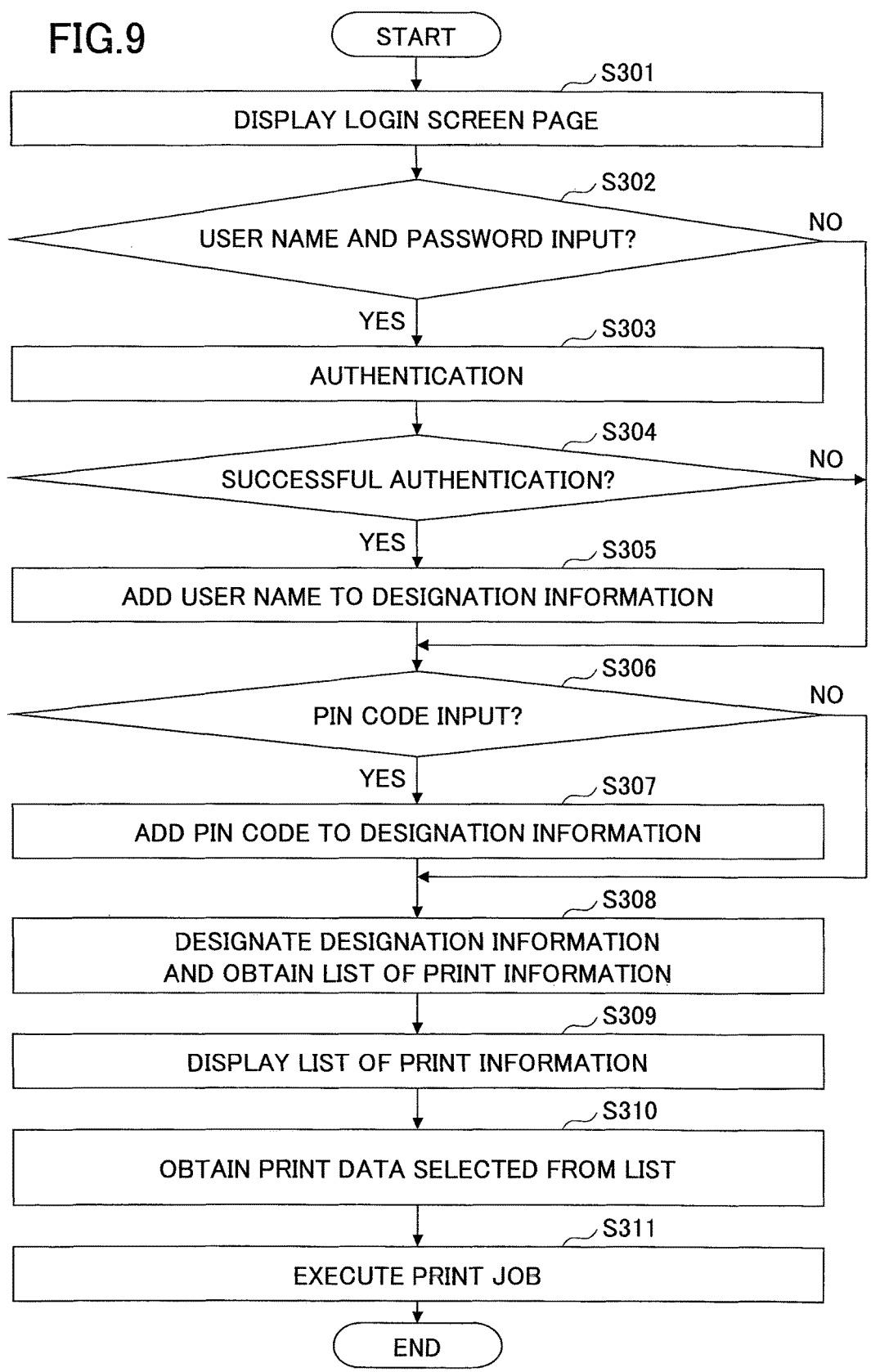
FIG. 9 is a flowchart illustrating one example of a procedure carried out by the image forming apparatus according to the first embodiment.

FIG. 9 is a flowchart illustrating one example of a procedure carried out by the image forming apparatus according to the first embodiment.

For example, in response to a function of printing print data stored in the storage server 60 being invoked, the authentication control part 221 displays a login screen page on the operation panel 25 (S301).

Figure 10:
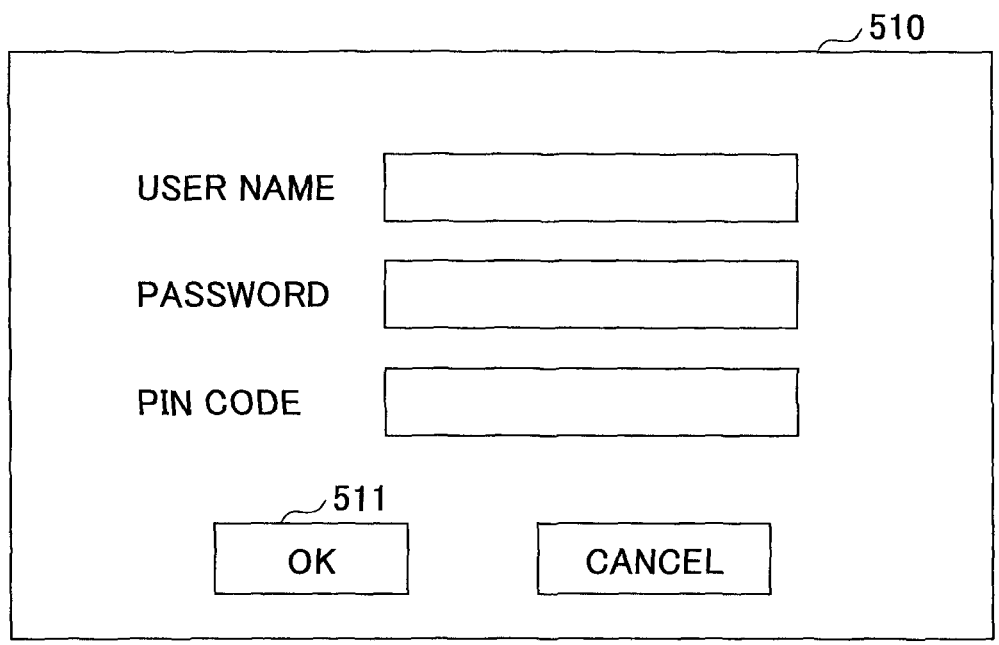
FIG. 10 shows a display example of a login screen page.

FIG. 10 shows a display example of a login screen page. In FIG. 10, a login screen page 510 has input areas for a user name, a password, a PIN code and so forth.

For example, when an operator of the image forming apparatus 20 is an authorized user, the user name and the password are input to the login screen page 510. On the other hand, when the operator is a guest user, the PIN code notified through the response mail is input to the login screen page 510.

Note that even when the operator is an authorized user, a PIN code can be input. For example, when an authorized user transmits a print request mail from a mail address of a user terminal for private use, i.e., not stored in the user information storage part 52, a PIN code is included in a response mail returned to the user terminal 30. Further, there can be a case where the same authorized user also transmits a print request mail from a mail address stored in the user information storage part 52 separately. In this case, concerning the authorized user, both a set of print data associated with the PIN code and a set of print data associated with the user name are stored in the storage server 60. In order to make it possible to carry out printing both the sets of print data by a one-time login operation, both "the user name and the password" and "the PIN code" can be input simultaneously.

When at least any one of "a user name and a password" and "a PIN code" is input to the login screen page 510 and an "OK" button 511 is pressed, the authentication control part 221 determines whether the user name and the password are input to the login screen page 510 (S302). When a user name and a password are input (YES in S302), the authentication control part 221 carries out authentication (S303). Specifically, the authentication control part 221 transmits an authentication request in which the user name and the password that are input are designated to the authentication server 50. The request response part 51 in the authentication server 50 determines whether the same combination of the user name and the password as that designated in the authentication request is stored in the user information storage part 52. When the same combination is stored in the user information storage part 52, the authentication is successful. When the same combination is not stored in the user information storage part 52, the authentication fails. The request response part 51 returns information indicating successful authentication or authentication failure to the authentication control part 221 of the image forming apparatus 20 that transmitted the authentication request.

When the authentication is successful (YES in S304), the print information obtaining part 222 adds the user name that was input to the login screen page 510 to "designation information" (S305). "Designation information" means information designated when a list of print information is to be obtained from the storage server 60 in step S308 described later. Step S305 is not executed when the authentication has failed (NO in S304).

When neither user name nor password is input to the login screen page 510 (NO in S302), when the authentication has failed based on the user name and the password (NO in S304) or when step S305 is executed, the print information obtaining part 222 determines whether a PIN code is input to the login screen page 510 (S306). When a PIN code is input (YES in S306), the print information obtaining part 222 adds the PIN code to the designation information (S307). When no PIN code is input (NO in S306), step S307 is not executed.

Next, the print information obtaining part 222 designates the designation information and obtains a list of print information from the storage server 60 (S308). In more detail, the print information obtaining part 222 designates the designation information and transmits a request to obtain print information to the storage server 60. In response to the request to obtain print information, the print information providing part 63 in the storage server 60 obtains the print information including the designation information designated in the request to obtain print information from the print information storage part 62 (FIG. 7). That is, when a user name and a password are input to the login screen page 510, the print information having the user mode "U" and including the user name is obtained. Note that the user name is also included in the print information based on a print request mail from a guest user in which the mail address of the authorized user concerning the user name is designated as the Cc address. Therefore, when a user name and a password are input to the login screen page 510, the print information having a user mode "G" and including the user name is obtained. As a result, as can be clearly seen from a description shown later, the authorized user can cause the image forming apparatus 20 to execute the print job that is based on a print request from a guest user. Thereby, in a case where, for example, the image forming apparatus 20 is installed in an area where no guest users are permitted to enter, the authorized user can cause the image forming apparatus 20 to carry out the print job by proxy. However, a configuration can also be provided in which under such an environment that protection of confidential information included in the print request mail from the guest user is given priority, when a user name and a password are input to the login screen page 510, the print information having a user mode "G" and including the user name is prevented from being obtained.

On the other hand, when a PIN code is input to the login screen page 510, the print information having a user mode "G" and the PIN code is obtained.

Further, when both "a user name and a password" and "a PIN code" are input to the login screen page 510 and the authentication is successful, the print information having the user mode "U" and including the user name and the print information having the user mode "G" and including the PIN code are obtained. When both "a user name and a password" and "a PIN code" are input to the login screen page 510 and the authentication has failed, the print information having the user mode "G" and including the PIN code is obtained.

The print information providing part 63 returns a list of the obtained print information to the image forming apparatus 20. Note that it is possible to omit the print data from each set of print information thus returned.

Next, the print information obtaining part 222 in the image forming apparatus 20 causes the operation panel 25 to display a list of the job names and/or the like included in the respective sets of print information returned (S309). The list indicates candidates for a print target. That is, the user can input an instruction to carrying out printing concerning the print information included in the list.

When one or more job names are selected from the list, the print information obtaining part 222 obtains the print data corresponding to the job names from the storage server 60 (S310). In more detail, the print information obtaining part 222 transmits a request designating the job names to obtain the print data to the storage server 60. In response to the request from the print information obtaining part 222, the print information providing part 63 in the storage server 60 returns the print data corresponding to the job names designated by the request to the image forming apparatus 20. Hereinafter, the print information concerning the selected job names will be referred to as "target print information".

Note that such a configuration can be provided that when only print information for one set of print data is obtained from a user name or a PIN code that is input, step S309 is not executed and the print information obtaining part 222 obtains the print data. Such a configuration can also be provided that, instead of the print information providing part 63 returning a list of print information to the image forming apparatus 20, the print information providing part 63 transmits the print data obtained from the user name or the PIN code.

Next, the print control part 223 controls execution of the print jobs concerning the print data (S311). As a result, sheets of paper on which the print data is printed are output. At this time, a log indicating the execution of the print jobs includes the user name included in the target print information. According to the present embodiment, also print information of a user having a user mode "G" includes a user name. That is, any one set of print information includes a user name. Therefore, when a billing destination concerning execution of a print job is determined based on a user name, it is possible to determine a billing destination also for a print job requested by a user of a user mode "G". Note that correspondence information between identification of billing destinations and user names can be stored in, for example, the HDD 214.

Further, when the user mode in the target print information is "U", that is, the operator of the image forming apparatus 20 is an authorized user, the print control part 223 executes print jobs within the scope of the authorization (print authorization) corresponding to the user name that was input at the time of login, in step S311. On the other hand, when the user mode in the target print information is "G", that is, the operator of the image forming apparatus 20 is a guest user, the print control part 223 executes print jobs within the scope of the authorization (print authorization) corresponding to the authorized user associated with the guest user. However, it is also possible that print jobs are executed within the scope of the authorization for the guest user. Note that the authorization for each authorized user can be stored, for example, in the user information storage part 52. Further, the authorization for each guest user can be stored in a guest information storage part. Respective guest users can have a common authorization or different individual authorizations.

As described above, according to the first embodiment, even a guest user for whom an account such as a user name, a password and/or the like are not registered in the authentication server 50 is given print authorization. Therefore, it is possible to reduce the necessity of requesting an authorized user to carry out printing. Further, a notification of a PIN code is sent to a guest user for each print request mail. Therefore, it is possible to give a pseudo and temporary account for each guest user. Therefore, print data that each guest user can manipulate is limited to print data corresponding to a print request mail from the guest user. As a result, it is possible to avoid an occurrence of such a situation that print data of another user can be easily manipulated among guest users.

Further, it is also possible to reduce the necessity of installing an image forming apparatus 20 dedicated for guest users.

Further, the mail address of any authorized user is designated as a Cc address of a print request mail from a guest user. As a result, it is possible to associate an authorized user with a print job requested by a guest user and it is possible to determine a billing destination for the cost of a print job based on the associating.

Further, there can be a case where even an authorized user is regarded as a guest user as a result of transmitting a print request mail from a mail address different from the registered mail address. Even in such a case, designation of the mail address of an authorized user as a Cc address is required. As a result, it is possible to determine a billing destination for the cost of a print job and so forth.

Note that where to designate the mail address of an authorized user is not necessarily "Cc" in a print request mail from a guest user. Instead, it is also possible to designate the mail address of an authorized user as "Bcc". Alternatively, it is also possible to designate the mail address of an authorized user as another destination of a print request mail together with the "To" destination address of the print request mail. That is, it is sufficient to include the mail address of an authorized user as a transmission destination of print request mail. In a case of using any of "Cc", "Bcc" and "To", an authorized user can detect that a print job is registered under his or her name as a result of a print request mail from a guest user being transmitted to the authorized user. As a result, an authorized user can detect unintended unauthorized registration of a print job, if any.

Note that when the same guest user transmits a plurality of print request mails, a plurality of response mails including respective different PIN codes are returned to the user terminal 30 of the guest user. In consideration of such a situation, the login screen page 510 can be configured such that a plurality of PIN codes can be input. The print information obtaining part 222 can be configured to obtain print information including any one of the plurality of PIN codes from the storage server 60. Thereby, it is possible to eliminate the complexity such as a repetition of login operation, displaying a list of print information and so forth for each PIN code.

Further, a configuration can be provided such that the PIN code generation part 13 in the management server 10 associates a generated PIN code with the transmission source address of a print request mail and stores them in, for example, the auxiliary storage device 102. When the transmission source address of a print request mail is associated with a PIN code and is stored in the auxiliary storage device 102, the PIN code generation part 13 does not generate a new PIN code but outputs the stored PIN code. In this case, a response mail including the PIN code is returned.

Thereby, when the same guest user transmits a plurality of print request mails, a single PIN code is assigned to the guest user not for each print request mail. Therefore, the guest user can cause the image forming apparatus 20 to carry out displaying a list of print information corresponding to the plurality of print request mails, printing and so forth, by inputting the assigned PIN code to the login screen page 510.

Note that it is also possible to provide limitations on printing print data concerning print information obtained through designation of a PIN code. For example, an upper limit can be provided on the number of printable sheets of paper, color printing can be inhibited, and/or the like. Thereby, it is possible to prevent a guest user from printing a very large number of sheets of paper and/or the like.

Further, a validity date can be provided on a PIN code. A PIN code having an expired validity date can be invalidated.

Next, the second embodiment will be described. Concerning the second embodiment, points different from the first embodiment will be described. Therefore, those not particularly described can be the same as the first embodiment.

As the second embodiment, an example will be described in which the functions of the management server 10, the authentication server 50 and the storage server 60 are provided via the Internet as cloud services. Therefore, in the second embodiment, the Internet is present among the user terminal 30, the mail server 40 and the management server 10, and also, among the image forming apparatus 20, the authentication server 50 and the storage server 60.

Figure 11:
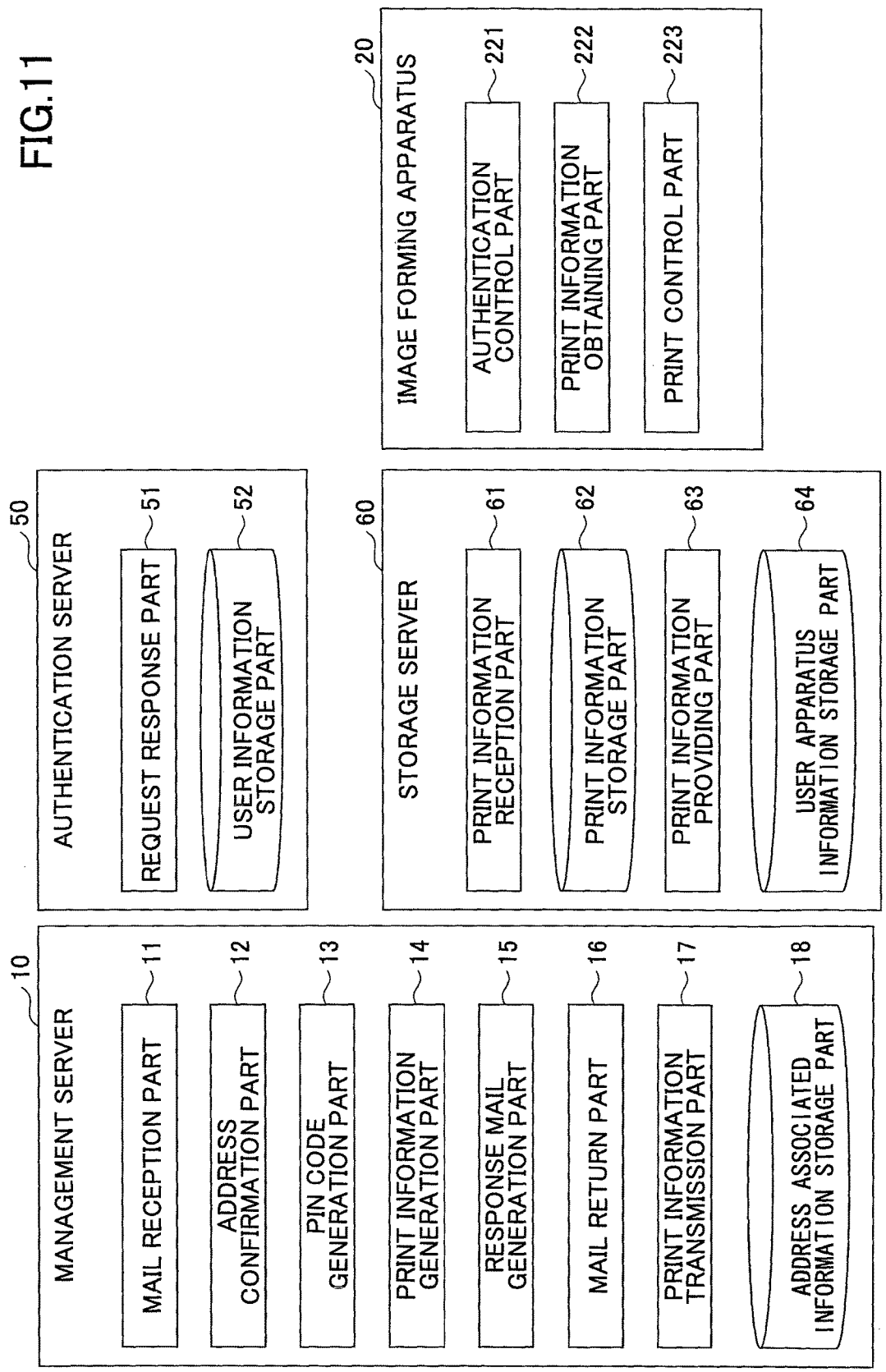
FIG. 11 shows a functional configuration example of a print system according to a second embodiment.

FIG. 11 shows a functional configuration example of a print system according to the second embodiment. In FIG. 11, the management server 10 further has an address associated information storage part 18. The address associated information storage part 18 stores mail addresses for the management server 10 assigned for respective company users. The address associated information storage part 18 can be implemented by using, for example, the auxiliary storage device 102, a storage device connected with the management server 10 via a network, or the like.

The storage server 60 further includes a user apparatus information storage part 64. The user apparatus information storage part 64 stores sets of identification information (hereinafter, referred to as "apparatus IDs") of respective image forming apparatuses 20 installed in the respective company users.

A procedure of storing print data according to the second embodiment can be the same as FIG. 5. However, the process contents are different concerning some steps. Specifically, in step S101, a user terminal 30 designates a mail address for the management server 10 assigned to a company user to which the image forming apparatus 20 to be used for printing belongs (where the image forming apparatus 20 to be used for printing is installed), and transmits a print request mail.

The mail reception part 11 in the management server 10 determines a company user whose image forming apparatus is to be used for printing based which mail address is used to receive the print request mail (which mail address is designated as the destination). The address associated information storage part 18 is used for the determination.

FIG. 12 shows a configuration example of the address associated information storage part. In FIG. 12, the address associated information storage part 18 stores, for each company user, a company code, a receiving address and so forth.

A company code is identification information assigned to each company user. A receiving address is a mail address for the management server 10 assigned to a company user. A receiving address is a mail address (or a part of a mail address) for the management server 10 to receive a print request mail from a corresponding company user.

The mail reception part 11 stores the company code corresponding to the mail address at which a print request mail is received in, for example, the memory device 103.

In a process of generating print information in step S109, the print information generation part 14 generates print information that further includes the company code stored in the memory device 103. Therefore, in step S112, the print information including the company code is transmitted to the storage server 60. When receiving the print information, the print information reception part 61 in the storage server 60 stores the print information in the print information storage part 62 (S113).

FIG. 13 shows a configuration example of the print information storage part according to the second embodiment. As shown in FIG. 13, according to the second embodiment, the print information storage part 62 further stores a company code for each print data. It is also possible to provide the print information storage part 62 for each company code.

Thereafter, the user who transmitted the print request mail goes to a place at which the image forming apparatus 20 is installed and operates the image forming apparatus 20. Next, a procedure carried out by the image forming apparatus 20 according to the operation of the user will be described.

A procedure carried out by the image forming apparatus 20 according to the second embodiment can be basically the same as FIG. 9. However, the process contents are different concerning some steps. Specifically, in step S308, the print information obtaining part 222 designates designation information further including a company code and an apparatus ID, and transmits a request to obtain a list of print information to the storage server 60. An apparatus ID is the apparatus ID of the image forming apparatus 20 and is stored in, for example, the ROM 213, the NVRAM 215, the HDD 214 or the like of the image forming apparatus 20. A company code is the company code of the company at which the image forming apparatus 20 is installed and is previously set to the image forming apparatus 20. The set company code is stored in, for example, the NVRAM 215, the HDD 214 or the like.

Note that an apparatus ID can be possessed by, for example, a specific application installed in the image forming apparatus 20. In this case, it is possible to identify the image forming apparatus 20 installing the specific application by the apparatus ID. That is, according to the second embodiment, as long as it is possible to identify the specific image forming apparatus 20, an application identifier possessed by the specific application, or the like, can be used as an apparatus ID.

The print information providing part 63 in the storage server 60 determines whether the same combination of the company code and the apparatus ID as the combination included in the designation information designated in the request to obtain a list of print information is stored in the user apparatus information storage part 64.

FIG. 14 shows a configuration example of the user apparatus information storage part. As shown in FIG. 14, the user apparatus information storage part 64 associates, for each image forming apparatus 20 installed in a company user, the company code of the company user with the apparatus ID of the image forming apparatus 20, and stores them.

When the same combination of the company code and the apparatus ID as the combination included in the designation information designated in the request to obtain a list of print information is not stored in the user apparatus information storage part 64, the print information providing part 63 does not return a list of print information. This is because, in this case, the validity of the image forming apparatus 20 which transmitted the request to obtain a list of print information is suspicious. In the second embodiment, the validity of the image forming apparatus 20 means that the image forming apparatus 20 is installed in a proper company user.

When the same combination of the company code and the apparatus ID as the combination included in the designation information designated in the request to obtain a list of print information is stored in the user apparatus information storage part 64, the print information providing part 63 obtains print information including the designation information designated in the request to obtain a list of print information from the print information storage part 62 (FIG. 13). That is, according to the second embodiment, the print information including the same company code as that included in the designation information is obtained. The print information providing part 63 returns a list of the obtained print information to the image forming apparatus 20.

Note that when it is not necessary to verify the validity of the image forming apparatus 20, it is possible to omit including a company code in designation information designated in a request to obtain a list of print information. It is possible that the print information providing part 63 determines a company code corresponding to an apparatus ID based on the apparatus ID included in designation information and the user apparatus information storage part 64, and uses the company code to obtain print information from the print information storage part 62.

According the second embodiment, as described above, a mail address for the management server 10 is different for each company user. Further, a company code is determined concerning a request to obtain a list of print information transmitted from the image forming apparatus 20 and a list of print information including the company code is returned to the image forming apparatus 20. Therefore, it is possible to prevent such a problematic situation that print information transmitted in response to a print request mail transmitted in a certain company becomes a print candidate for another user having the same user name in another company.

Note that when the mail address of the transmission source of a print request mail is the same as the mail address of an authorized user in any company user, it is possible to determine the company code from the mail address as a result of managing correspondence information between the mail addresses of authorized users and company codes. Further, when the mail address of the transmission source of a print request mail is the same as the mail address of a guest user, it is possible to determine the company code from the mail address of an authorized user designated as a Cc address or the like of the print request mail. Therefore, it is not necessary to provide a mail address for the management server 10 for each company user.

A mail address itself for the management server 10 for each authorized user can be used as a company code. In this case, it is possible to omit the user apparatus information storage part 64. The mail address is included in print information which is stored in the storage server 60. The mail address is previously stored in the image forming apparatus 20. The image forming apparatus 20 transmits a request to obtain a list of print information in which the mail address is designated together with the apparatus ID to the storage server 60. The storage server 60 returns a list of print information including the mail address designated in the request to obtain a list of print information.

Also in this configuration, it is possible to obtain the same advantageous effects.

Next, the third embodiment will be described. Concerning the third embodiment, points different from the first and second embodiments will be described. Therefore, those not particularly described can be the same as the first embodiment or the second embodiment.

Concerning the third embodiment, a variant of a process carried out at a time of user authentication in the image forming apparatus 20 will be described.

Concerning the first embodiment, the example is described where a user name and a password, a PIN code, or the like, are input to the login screen page 510. In this case, a user inputs these sorts of information using a software keyboard or the like. In order to reduce such an operation load, according to the third embodiment, the image forming apparatus 20 includes a non-contact type card reader. A user uses the user terminal 30 of a portable type including an IC chip similar to an IC card. For example, a user name and a password are stored in a storage part of the user terminal 30. Further, an application is installed in the user terminal 30 for reading the user name and the password from the storage part and transmitting them to the image forming apparatus 30 via the card reader of the image forming apparatus 20 when the user terminal 30 is held up to the card reader. The authentication control part 221 in the image forming apparatus 20 carries out authentication using the user name and the password received through the card reader.

By the above-described configuration, an authorized user can be authenticated by holding his or her own user terminal 30 up to the image forming apparatus 20.

Further, when the user of the user terminal 30 is a guest user, a response mail including a PIN code is returned in response to a print request mail transmitted by the user terminal 30, and the response mail is stored in a storage part in the user terminal 30. The above-mentioned application can be configured in such a manner that when the user terminal 30 is held up to the card reader of the image forming apparatus 20, the application searches the user terminal 30 for the electronic mail (that is, the above-mentioned response mail) having the transmission source address that is a predetermined mail address. Then, when the corresponding electronic mail is present, the application transmits the PIN code included in the electronic mail to the image forming apparatus 20 via the card reader. A configuration can be provided such that the print information obtaining part 222 in the image forming apparatus 20 designates the PIN code received via the card reader to obtain print information.

By the above-described configuration, a guest user can read a list of print information associated with the PIN code assigned to the guest user by holding his or her own user terminal 30 up to the image forming apparatus 20.

Further, when both "a user name and a password" and "a PIN code" are stored in the user terminal 30, the image forming apparatus 20 can have such a configuration as to obtain the both and obtain print information corresponding to the user name and print information corresponding to the PIN code.

Note that in the respective embodiments described above, printing by the image forming apparatus 20 has been described. However, the present invention can be applied not only to printing but also to, for example, outputting image data to a projector and so forth. That is, it is possible to apply the present invention in such a manner that print target data is replaced by output target data to be output, i.e., to be displayed by a terminal, to be projected by a projector, or the like.

Further, in the respective embodiments described above, description has been made using the example of transmitting print target data via a mail. However, a configuration can be provided such that a communication way other than a way of using a mail can be used to transmit print target data to the management server 10. In this case, the management server 10 receives, from the user terminal 30, print target data, the mail address of an authorized user, or further the mail address of a guest user. When the same mail address of the authorized user is stored in the user information storage part 52 and the mail address of the guest user is received, the management server 10 generates a PIN code and transmits the PIN code to the respective mail addresses of the guest user and the authorized user.

Further, when company codes are managed as in the second embodiment, the management server 10 receives, from the user terminal 30, print target data, the mail address of an authorized user, or further the mail address of a guest user, and a company code. When no company code is received or the same company code as the received company code is not stored in the management server 10, the management server 10 transmits a notification to the user terminal 30 indicating that printing print target data is not permitted. When the same company code is present, the same mail address as the authorized user is stored in the user information storage part 52 and the mail address of the guest user is received, the management server 10 generates a PIN code and transmits the PIN code to the respective mail addresses of the guest user and the authorized user.

Note that in the respective embodiments described above, the management server 10 and the storage server 60 can be implemented by a single computer. Also, the management server 10, the storage server 60 and the authentication server 50 can be implemented by a single computer. Further, the respective functions of the management server 10, the storage server 60 and the authentication server 50 can be mounted in the image forming apparatus 20.

Inversely, each of the management server 10, the storage server 60 and the authentication server 50 can be implemented by a plurality of computers in a dispersion manner.

Further, for the respective embodiments described above, the example has been described where print data is generated in the management server 10. However, generation of print data concerning electronic data attached to a print request mail can be carried out by the user terminal 30, the management server 10, the storage server 60 or the image forming apparatus 20.

Next, the fourth embodiment will be described. Concerning the fourth embodiment, a variant of the second embodiment will be described.

Figure 15:
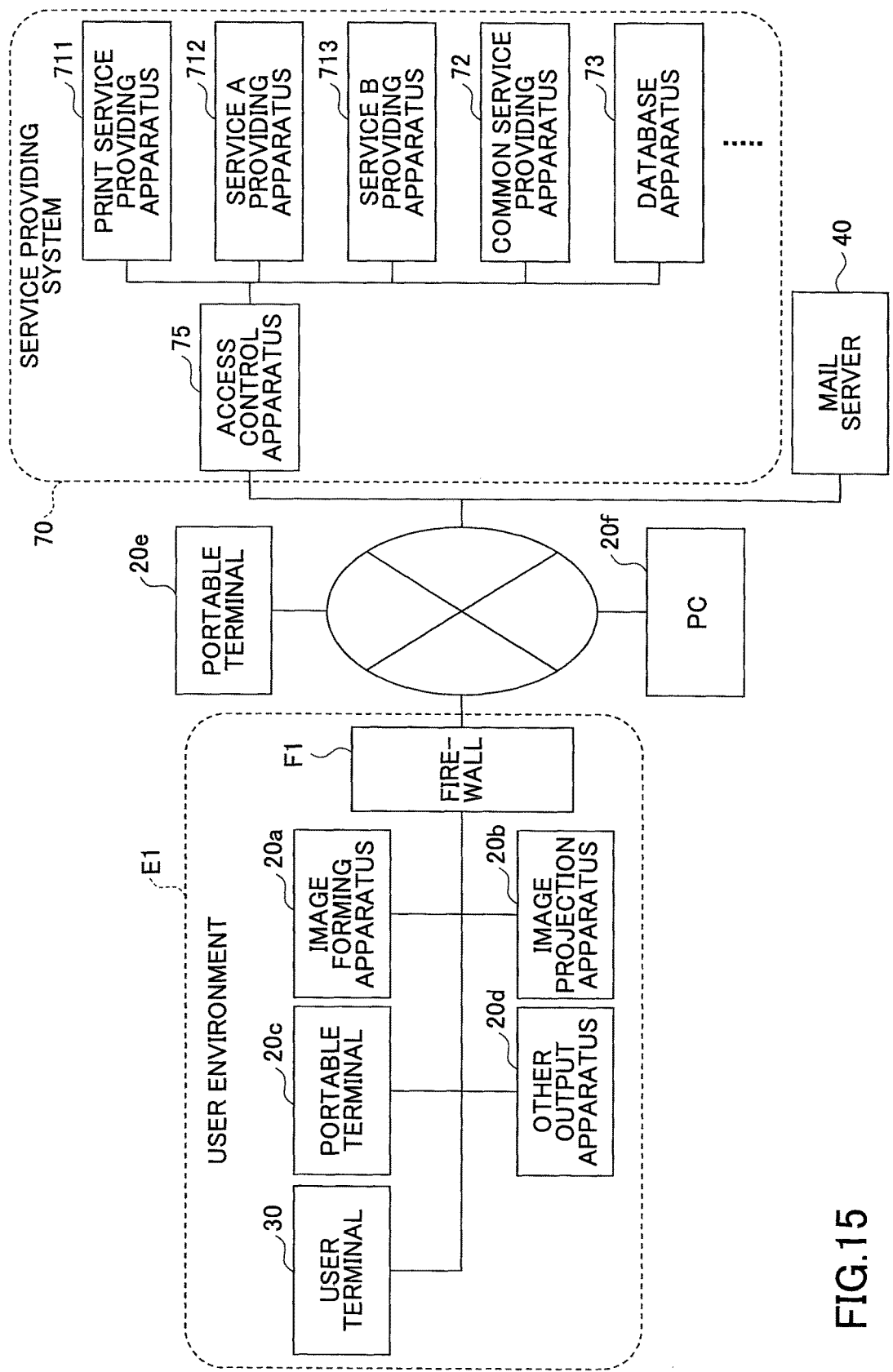
FIG. 15 shows a system configuration example of a fourth embodiment.

FIG. 15 shows a system configuration example of the fourth embodiment. In FIG. 15, the same reference numerals are given to parts having the same roles as those in FIG. 1 and description thereof is omitted. In FIG. 15, a service providing system 70 and a user environment E1 are communicatable via a wide-area communication network such as the Internet.

The service providing system 70 is a computer system providing cloud services via the network. Note that according to the fourth embodiment, cloud services are specially adopted for illustration purpose. However, the present embodiment can also be applied to various services provided via a network such as services provided by Application Service Provider (ASP), Web services, and so forth.

The service providing system 70 includes, for example, an access control apparatus 75, a print service providing apparatus 711, a service A providing apparatus 712, a service B providing apparatus 713, a common service providing apparatus 72 and a database apparatus 73. Each of these respective apparatuses can be implemented by a single computer.

The access control apparatus 75 controls access from the outside to the computers in the service providing system 70 and carries out load sharing among the respective computers.

The print service providing apparatus 711 is one or more computers controlling processes for providing cloud printing services. The cloud printing services mean services for making it possible to upload print data in a cloud environment (the service providing system 70 in the fourth embodiment) and, as is necessary, causing an image forming apparatus 20a to print the uploaded pint data.

The service A providing apparatus 712 and the service B providing apparatus 712 illustrate a group of computers, which provide services other than the cloud printing services.

The common service providing apparatus 72 is one or more computers having functions that are common to the print service providing apparatus 711, the service A providing apparatus 712, the service B providing apparatus 713 and so forth which provide specific services directly via the network, or having functions used by the plurality of apparatuses.

The database apparatus 73 is one or more computers or storage apparatuses that function as various storage parts.

The user environment E1 is a system environment in an organization such as a user company that is one example of a user. The user environment E1 shown in FIG. 15 includes the image forming apparatus 20a, an image projection apparatus 20b, a portable terminal 20c, another output apparatus 20d and a user terminal 30. These apparatuses and terminals are connected via a network (of a wired type or a wireless type) such as a Local Area Network (LAN).

The image forming apparatus 20a is the image forming apparatus 20 in the second embodiment.

The image projection apparatus 20b is, for example, a projector, and is an apparatus carrying out projection of image data. The portable terminal 20c is a Personal Digital Assistance (PDA), a tablet terminal, a smartphone, a portable phone or the like. The other output apparatus 20d is one or more of various output apparatuses.

The user environment E1 further includes a firewall F1. The firewall F1 can be the same as a common firewall. The firewall F1 blocks requests transmitted from the outside of the user environment E1, for example.

It is possible to access the service providing system 70 also from environments other than the user environment E1. For example, it possible to access the service providing system 70 from a portable terminal 20e, a PC 20f or the like via the Internet or the like. The portable terminal 20e and the PC 20f can be used also in the user environment E1.

Figure 16:
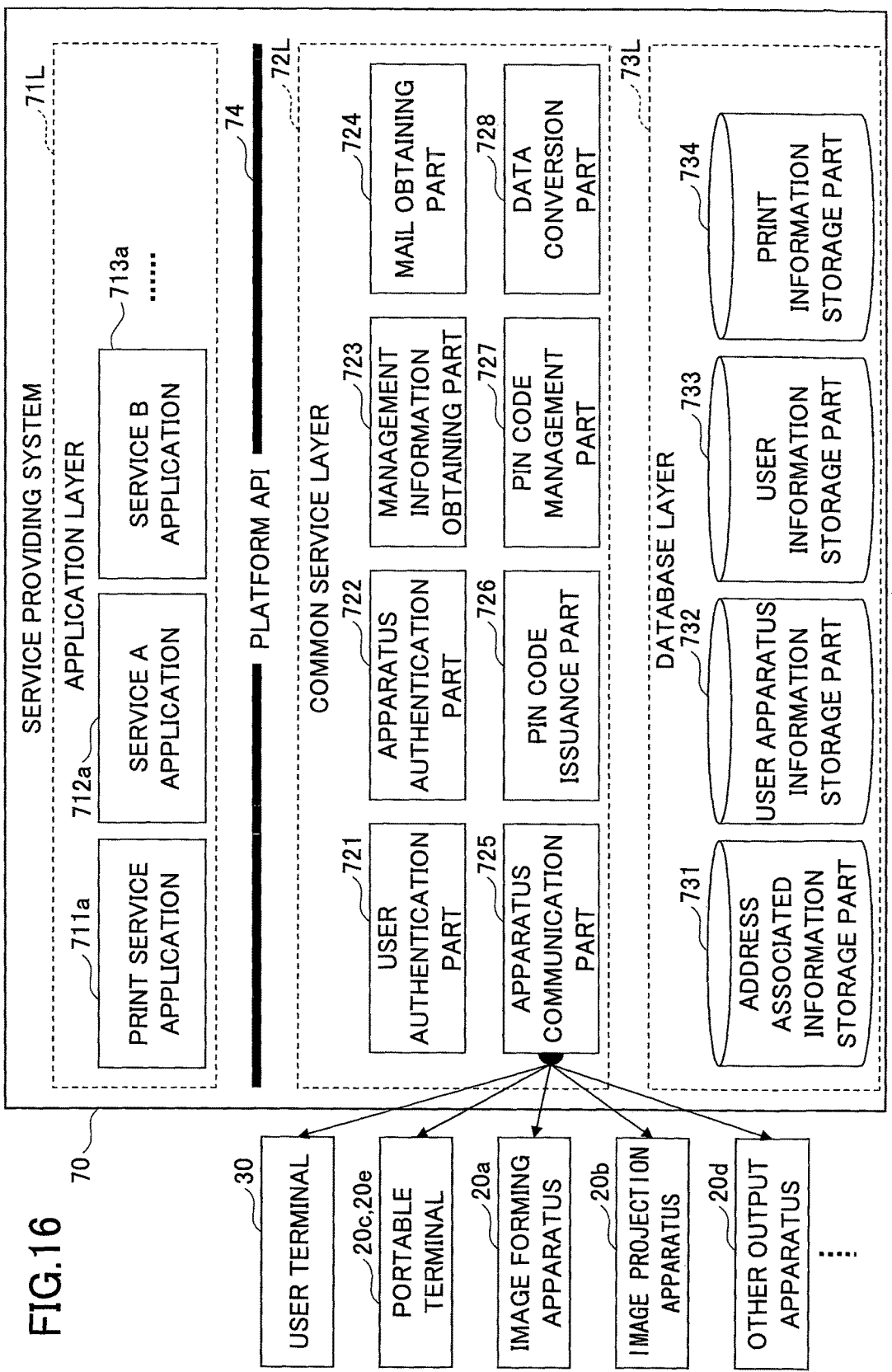
FIG. 16 shows a functional configuration example of a service providing system according to the fourth embodiment.

FIG. 16 shows a functional configuration example of the service providing system according to the fourth embodiment. In FIG. 16, the functions of the service providing system 70 are classified into an application layer 71L, a common service layer 72L, a database layer 73L and so forth.

In the application layer 71L, applications (hereinafter, referred to as "server applications") on a server side cooperating with the apparatuses such as the image forming apparatus 20a are installed. In FIG. 16, the application layer 71L includes server applications such as a print service application 711a, a service A application 712a, a service B application 713a and so forth.

The print service application 711a is a server application concerning cloud printing services. In the present embodiment, the print service application 711a is installed in the print service providing apparatus 711. The service A application 712a and the service B application 713a illustrate other service applications. In the present embodiment, the service A application 712a and the service B application 713a are installed in the service A providing apparatus 712 and the service B providing apparatus 713, respectively.

The common service layer 72L includes functions common to a plurality of server applications, basic functions used by a plurality of server applications and so forth, and is installed in the common service providing apparatus 72. The functions of the common service layer 72A can be invoked via a platform API 74. Basically, the platform API 74 is invoked by server applications in the application layer 71L. Note that the platform API 74 can be opened to a third vendor or the like other than an operator of the service providing system 70. In this case, the server applications can be installed by the third vendor of the like. That is, the server applications are appropriately developed by using the platform API 74 and are added.

In FIG. 16, the common service layer 72L includes a user authentication part 721, an apparatus authentication part 722, a management information obtaining part 723, a mail obtaining part 724, an apparatus communication part 725, a PIN code issuance part 726, a PIN code management part 727, a data conversion part 728 and so forth.

The user authentication part 721 authenticates a user. The apparatus authentication part 722 authenticates corresponding relationships among the image forming apparatus 20a, a user and an organization. An organization is such a concept that it can be a "company" in the respective embodiments described above, another association or the like. Note that in the fourth embodiment, identification information corresponding to a "company" in the second embodiment is referred to as an "organization code". Therefore, authentication of corresponding relationships between a user and an organization is a process including verifying that the user and the image forming apparatus belong to the organization.

The management information obtaining part 723 obtains information stored in the database layer 73L in response to a request from the application layer 71L, for example. The mail obtaining part 724 obtains (receives) an electronic mail stored in the mail server 40 according to Post Office Protocol (POP) or the like. The apparatus communication part 725 communicates with various apparatuses. The PIN code issuance part 726 issues (generates) a PIN code. The PIN code management part 727 manages corresponding relationships between PIN codes and organization codes. The data conversion part 728 converts a data format. In the present embodiment, the data conversion part 728 generates print data based on print target data.

Note that the respective server applications in the application layer 71L and the respective parts in the common service layer 72L are implemented by processes carried out by the respective computers according to one or more programs installed in the respective computers included in the service providing system 70.

The database layer 73L includes a database (storage part) storing various information and is implemented by the database apparatus 73. In FIG. 16, the database layer 73L includes an address associated information storage part 731, a user apparatus information storage part 732, a user information storage part 733, a print information storage part 734 and so forth.

The address associated information storage part 731 has the same configuration as the address associated information storage part 18 (FIG. 12). The user apparatus information storage part 732 has the same configuration as the user apparatus information storage part 64 (FIG. 14). The user information storage part 733 has approximately the same configuration as the user information storage part 52 (FIG. 6). Different points between the user information storage part 733 and the user information storage part 52 will be described later. The print information storage part 734 has the same configuration as the print information storage part (FIG. 7).

Note that the manner of classification shown in FIG. 16 is one example. In order to implement the present embodiment, it is not necessary to classifying the respective sets of software and the respective storage parts in the service providing system 70 in the layers as shown in FIG. 16. That is, as long as the same procedure as the present embodiment can be carried out, the layer relationship among the sets of software and the storage parts in the service providing system 70 is not limited to a specific one.

Figure 17:
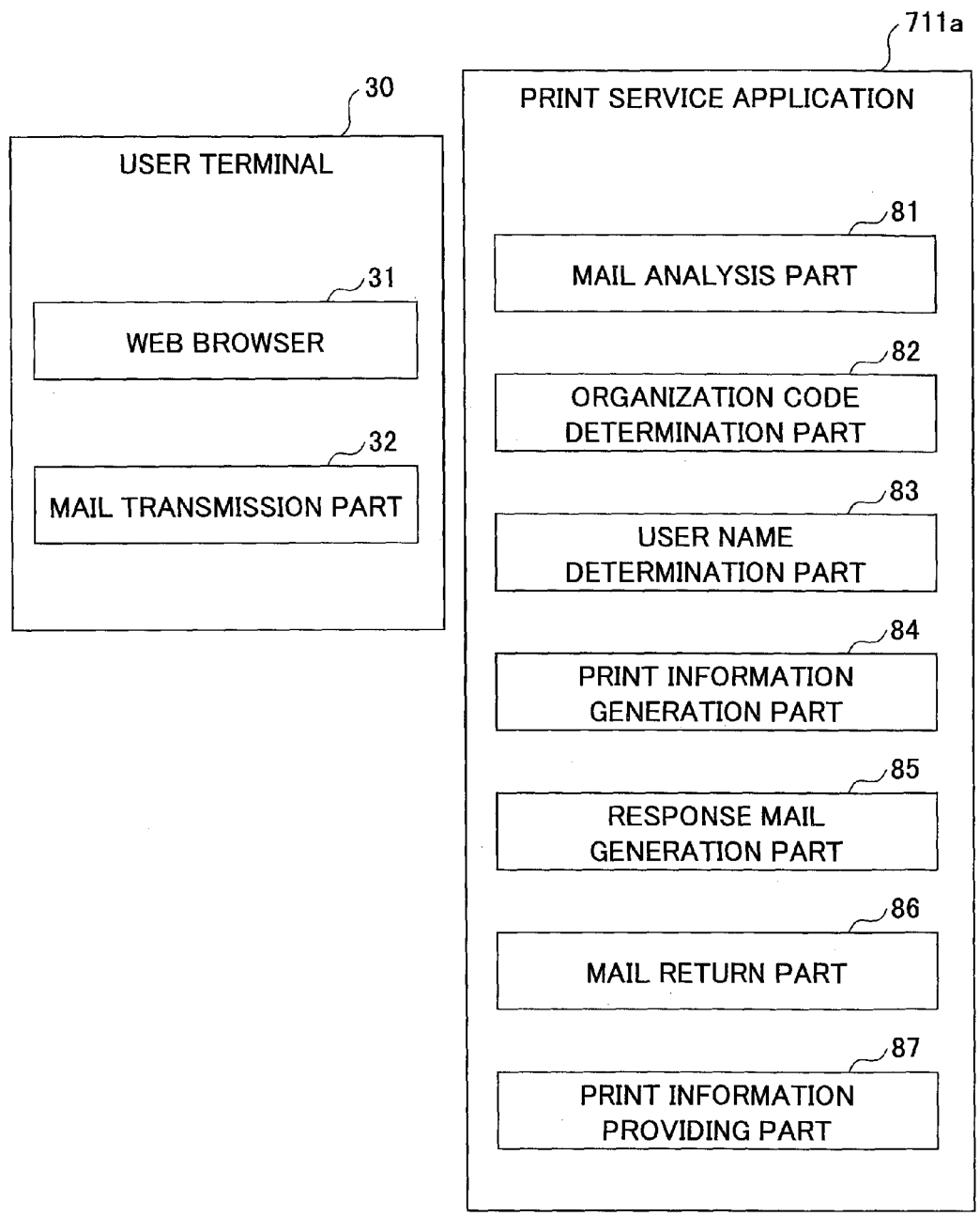
FIG. 17 shows a functional configuration example of a user terminal and a print service application according to the fourth embodiment.

FIG. 17 shows a functional configuration example of the user terminal and the print service application according to the fourth embodiment.

In FIG. 17, the user terminal 30 includes a Web browser 31, a mail transmission part 32 and so forth. The Web browser 31 is a common Web browser. The mail transmission part 32 transmits an electronic mail. In the present embodiment, the mail transmission part 32 transmits a print request mail. Note that the mail transmission part 32 is implemented by a process carried out by the user terminal 30 according a program called a "mailer".

The print service application 711a includes a mail analysis part 81, an organization code determination part 82, a user name determination part 83, a print information generation part 84, a response mail generation part 85, a mail return part 86, a print information providing part 87 and so forth.

The mail analysis part 81 analyses a print request mail and extracts print target data and so forth from the print request mail. The organization code determination part 82 determines the organization code corresponding to the destination address of a print request mail. The user name determination part 83 determines the user name corresponding to the transmission source address or the Cc address of a print request mail. The functions of the print information generation part 84, the response mail generation part 85, the mail return part 86 and the print information providing part 87 are the same as the print information generation part 14, the response mail generation part 15, the mail return part 16 and the print information providing part 63 in FIG. 11.

Below, a procedure carried out in the fourth embodiment will be described. First, an outline of the procedure in the fourth embodiment will be described using a flowchart.

Figure 18:
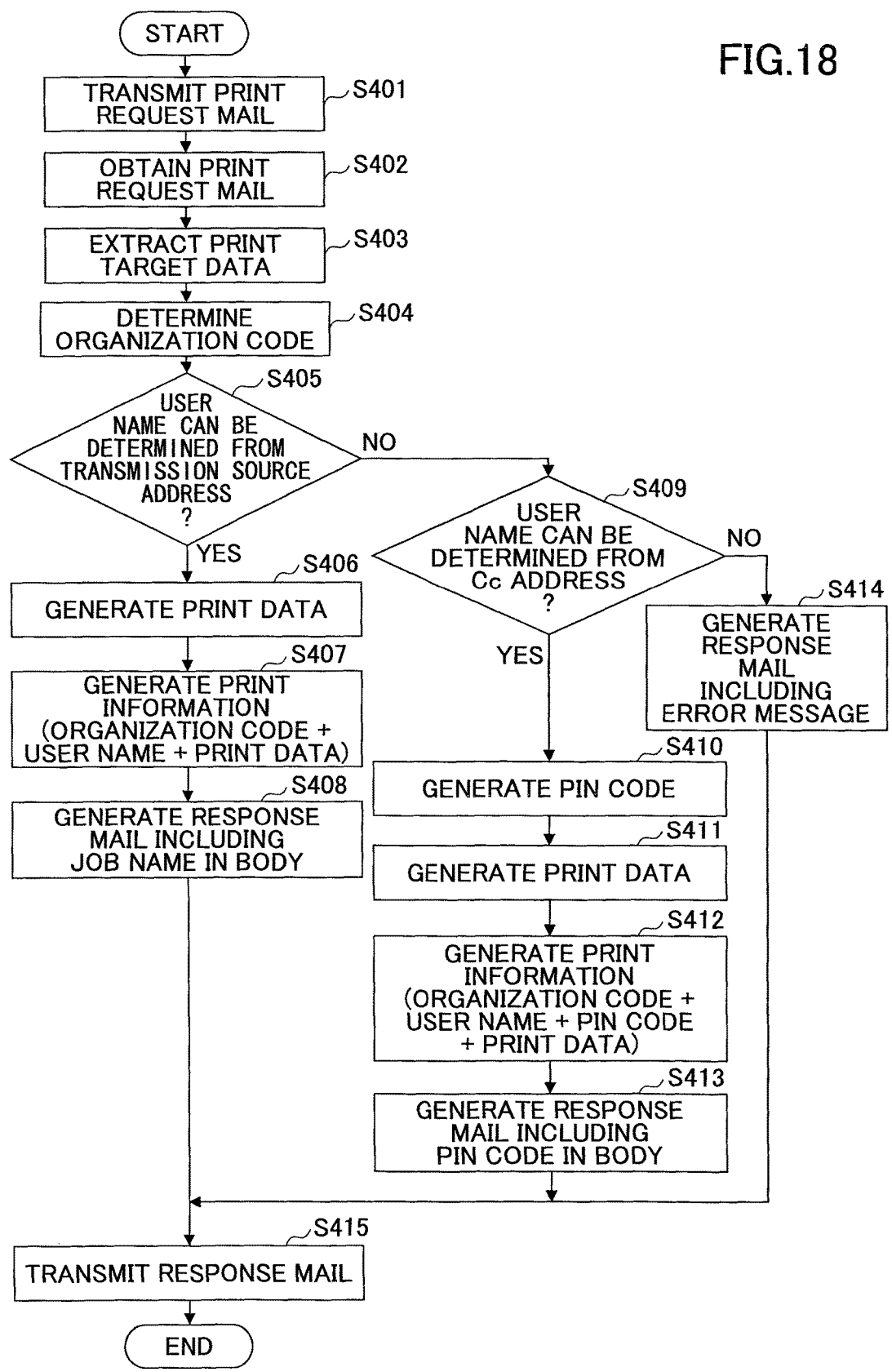
FIG. 18 is a flowchart illustrating one example of a procedure of registering print information using a print request mail.

FIG. 18 is a flowchart illustrating one example of a procedure of registering print information using a print request mail.

In step S401, in response to an instruction that is input by the user, the mail transmission part 32 in the user terminal 30 transmits a print request mail to a mail address assigned to the organization that the user belongs to. The contents of the print request mail are the same as those described above for the respective embodiments.

Next, the mail obtaining part 724 in the service providing system 70 obtains the print request mail from the mail server 40 (S402). Next, the mail analysis part 81 in the print service application 711a extracts the print target data from the print request mail (S403). Next, the organization code determination part 82 in the print service application 711a determines the organization code corresponding to the print request mail based on the destination address of the print request mail and the address associated information storage part 731 (S404). That is, the organization code associated with the destination address and stored in the address associated information storage part 731 is obtained. Note that in the fourth embodiment, the configuration of the address associated information storage part 731 can be the same as the address associated information storage part 64 (FIG. 12). However, "company codes" in the address associated information storage part 64 are replaced by "organization codes".

Next, the user name determination part 83 in the print service application 711a determines whether it is possible to determine the user name based on the transmission source address of the print request mail (S405). Specifically, it is determined whether the same transmission source address is associated with the organization code (hereinafter, referred to as "target organization code") determined in step S404 and stored in the user information storage part 733.

FIG. 19 shows a configuration example of the user information storage part according to the fourth embodiment. As shown in FIG. 19, the user information storage part 733 has an organization code and a "role" in addition to the items that the user information storage part 52 (FIG. 6) has.

The "role" is information for determining whether each user is an administrator or a user. An administrator means an administrator of an apparatus such as the image forming apparatus 20a cooperating with the service providing system 70. An administrator carries out, for example, operations for causing the image forming apparatus 20a and the service providing system 70 to cooperate with one another. An user is a user who uses a service provided by the service providing system 70.

In step S405, it is determined whether the user information storage part 733 stores user information including the target organization code and the transmission source address. When the corresponding user information is present, the user name (hereinafter, referred to as "target user name") included in the user information is obtained.

When the target user name is thus obtained (YES in S405), the data conversion part 728 in the service providing system 70 generates print data concerning the print target data (S406). Note that it is not necessary to generate print data when the print target data has a format printable even without being converted.

Next, the print information generation part 84 generates print information (S407). In the print information, the job name, the target organization code, the target user name and the print data are included. The print information generation part 84 stores the generated print information in the print information storage part 734.

Next, the response mail generation part 85 in the print service application 711a generates a response mail (S408). The response mail includes, for example, the job name. Next, the mail return part 86 transmits the response mail to the transmission source address of the print request mail (S415).

On the other hand, when no user name can be determined based on the transmission source address (NO in S405), the user name determination part 83 determines whether it is possible to determine the user name based on the Cc address of the print request mail (S409). Specifically, it is determined whether user information including the same address as the Cc address is associated with the target organization code and stored in the user information storage part 733 (FIG. 19). When the corresponding user information is stored, the user name included in the user information is obtained as a target user name.

When the target user name is thus determined (YES in S409), the PIN code issuance part 726 in the service providing system 70 generates a PIN code (S410). In step S411 and the subsequent steps, the same processes as step S407 and the subsequent steps are carried out. Note that the print information generated in step S412 includes the job name, the organization code, the target user name, the PIN code and the print data. Further, in step S413, the response mail including the PIN code and the job name is generated.

When no user name can be determined based on any one of the transmission source address and the Cc address (NO in S409), the response mail generation part 15 generates a response mail (hereinafter, referred to as "error mail") including an error message, for example (S414). In this case, in step S415, the error mail is returned. Further, in this case, no print information is generated. Therefore, steps S112 and S113 in FIG. 5 are not executed. That is, the user cannot carry out printing.

Thus, when an organization code and a user name are determined based on transmission destination addresses in a print request mail, the destination address ("To address") as one transmission destination address is used to determine the organization code and the Cc address as another transmission destination address is used to determine the user name. Thus, in comparison to including all the addresses as destination addresses, it is possible to make it easier to distinguish between the information to be used to determine the organization code and the information to be used to determine the user name.

Next, a case will be described where print information is registered through the Web browser 31 that the user terminal 30 has. That is, in the fourth embodiment, print information can be registered by a way different from using a print request mail.

Figure 20:
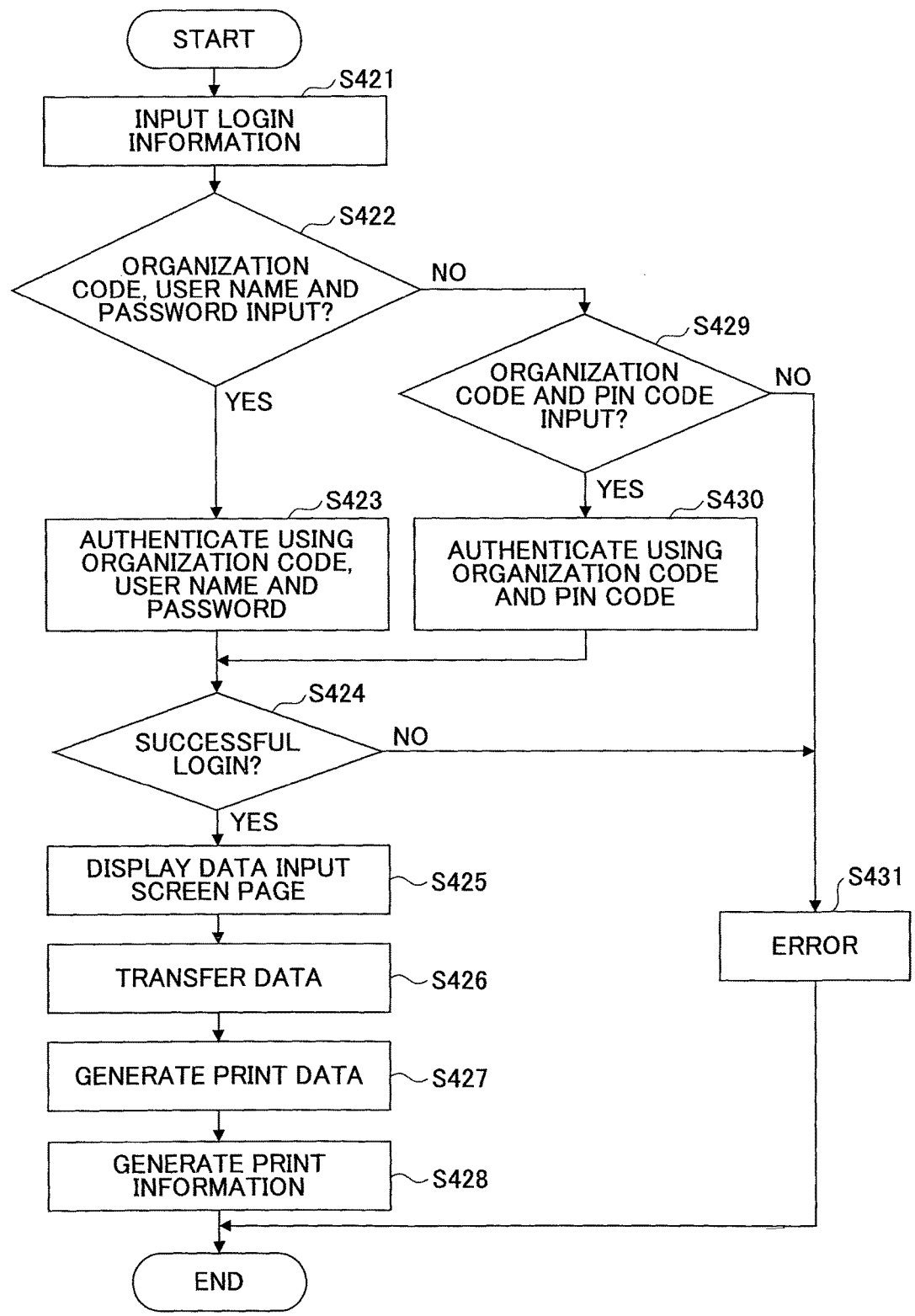
FIG. 20 is a flowchart illustrating one example of a procedure of registering print information using a Web interface.

FIG. 20 is a flowchart illustrating one example of a procedure of registering print information using a Web interface. It is assumed that in the initial state of FIG. 20, a login screen page for the service providing system 70 is displayed by the Web browser 31 in the user terminal 30.

In step S421, the Web browser 31 receives login information that is input by a user through the login screen page.

Figure 21:
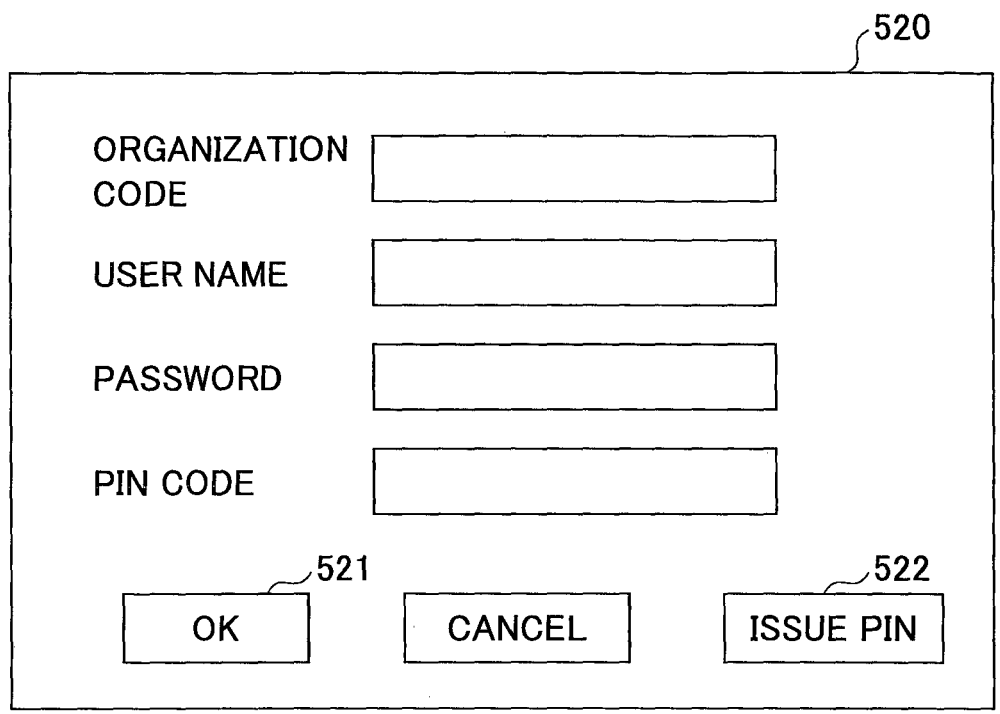
FIG. 21 shows a display example of a login screen page shown in the user terminal according to the fourth embodiment.

FIG. 21 shows a display example of the login screen page shown in the user terminal according to the fourth embodiment. In FIG. 21, the login screen page 520 includes input areas for an organization code, a user name, a password, a PIN code and so forth. The login screen page 520 further includes an OK button 521, an "issue. PIN" button 522 and so forth.

There are two patterns for login. In a pattern 1, an organization code, a user name and a password are designated. In a pattern 2, an organization code and a PIN code are designated. Note that in a case of the pattern 2, the user needs to previously have a PIN code issued. The user presses the "issue PIN" button 522 to have a PIN code issued. A procedure when the "issue PIN" button 522 is pressed will be described later.

When the OK button 521 on the login screen page 520 is pressed, the Web browser 31 determines whether an organization code, a user name and a password are input to the login screen page 520 (S422). Note that a process carried out by the Web browser 31 is based on definitions included in a Web page (HyperText Markup Language (HTML) data and/or the like) causing the Web browser 31 to display the login screen page.

When an organization code, a user name and a password are input to the login screen page 520 (YES in S422), the Web browser 31 receives authentication by the service providing system 70 based on the organization code, the user name and the password (S423). That is, the organization code, the user name and the password are transmitted to the user authentication part 721. The user authentication part 721 carries out authentication based on whether the same combination of the organization code, the user name and the password is stored in the user information storage part 733.

When the authentication is successful and login is permitted (YES in S424), the Web browser 31 displays a data input screen page (S425). The data input screen page is used for causing a file to be printed selected from among the files stored in the user terminal 30. When a file is thus selected through the data input screen page, the Web browser 31 transfers the data stored in the file to the service providing system 70 (S426).

When receiving the data, the service providing system 70 carries out the same processes as steps S406 and S407 in FIG. 18 (S427 and S428). As a result, print information based on the data is stored in the print information storage part 734.

On the other hand, when an organization code, a user name and a password are not input to the login screen page 520 (NO in S422), the Web browser 31 determines whether what is input is an organization code and a PIN code (S429). When what is input is an organization code and a PIN code (YES in S429), the Web browser 31 receives authentication by the service providing system 70 based on the organization code and the PIN code (S430). That is, authentication is carried out based on whether the same combination of the organization code and the PIN code is registered in the service providing system 70.

When the authentication is successful and login is permitted (YES in S424), the Web browser 31 executes step S425 and the subsequent steps. However, in this case, in step S428, the same process as step S412 in FIG. 18 is carried out. As a result, print information including the organization code, the user name of the authorized user corresponding to the PIN code and the PIN code is stored in the print information storage part 734. The user name of the authorized user corresponding to the PIN code is determined using a PIN code management table described later.

Note that when the input pattern to the login screen page 520 is neither the pattern 1 nor the pattern 2 (NO in S429) or the login has failed (NO in S424), the Web browser 31 displays an error screen page (S431). In this case, no print information is registered.

Next, a process of issuing a PIN code through the Web interface carried out before receiving authentication of an organization code and the PIN code will be described.

Figure 22:
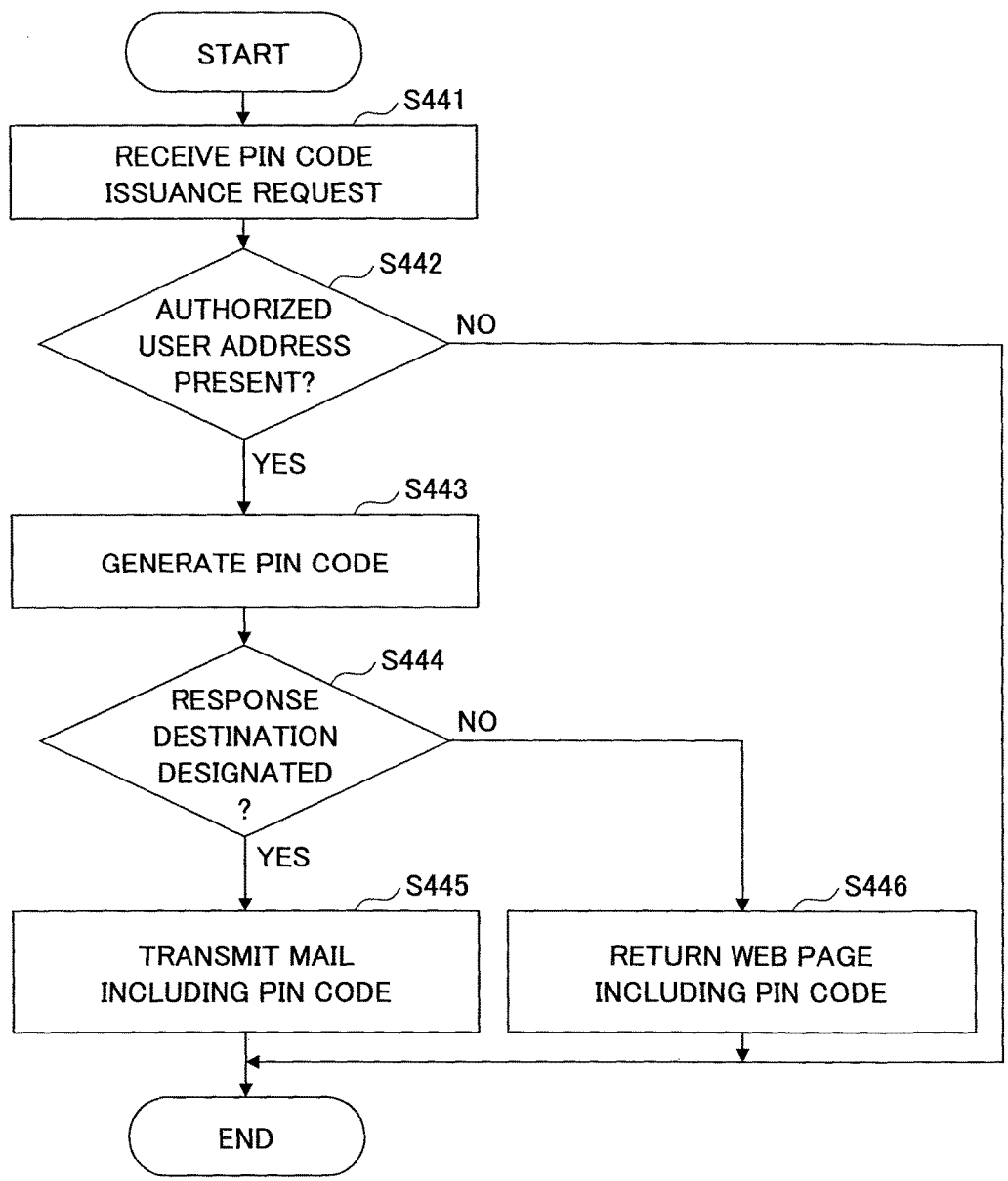
FIG. 22 is a flowchart illustrating one example of a procedure of issuing a PIN code through the Web interface.

FIG. 22 is a flowchart illustrating one example of a procedure of issuing a PIN code through the Web interface. It is assumed that in the initial state in FIG. 22, the login screen page 520 (FIG. 21) is displayed by the Web browser 31 in the user terminal 30.

In step S441, the Web browser 31 receives a request to issue a PIN code (S441). A request to issue a PIN code is received as a result of, after an organization code is input to the login screen page 520, the issue PIN button 522 being pressed. Note that such a configuration can also be provided that, in response to the issue PIN button 522 being pressed, the Web browser 31 displays a response destination address designation screen page such as that shown in FIG. 23.

Figures 23, 24:
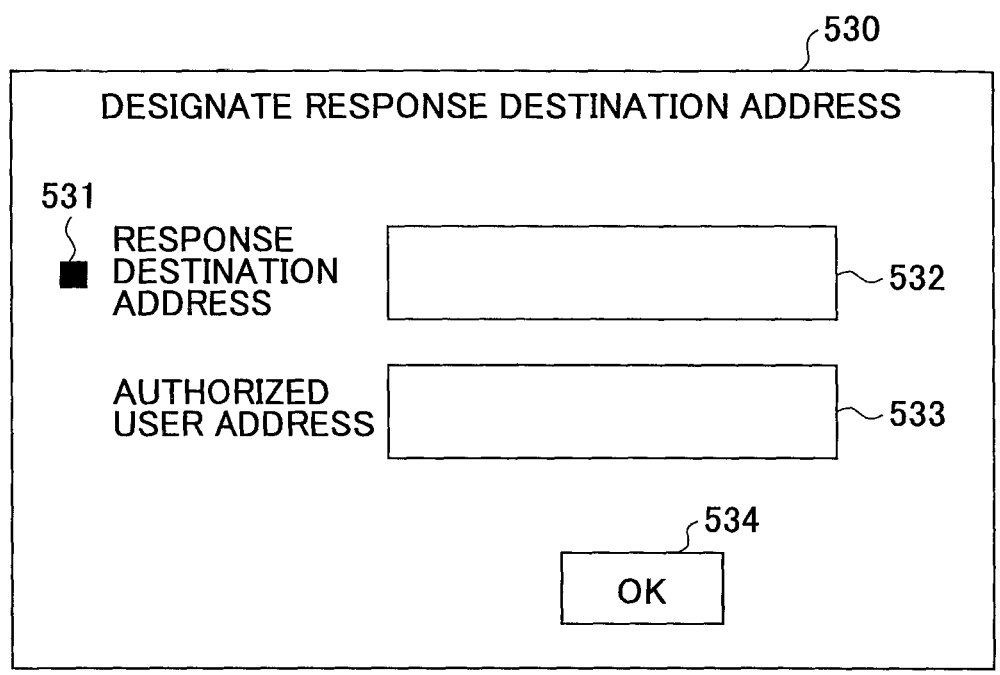
FIG. 23 shows a display example of a response destination address designation screen page shown in the user terminal.
FIG. 24 shows a configuration example of a PIN code management table.

FIG. 23 shows a display example of the response destination address designation screen page shown in the user terminal. In FIG. 23, the response destination address designation screen page 530 includes a check button 531, a response destination address input area 532, an authorized user address input area 533, an OK button 534 and so forth.

The response destination address input area 532 receives an input of a mail address (hereinafter, referred to as "response destination address") of a response destination of an electronic mail including a PIN code to be issued. The check button 531 receives an instruction as to whether to receive, by an electronic mail, a notification of a PIN code to be issued. When the check button 531 is checked, an input to the response destination address input area 532 is allowed.

The authorized user address input area 533 receives an input of the mail address of an authorized user. That is, in order to have a PIN code issued, an input of the mail address of any authorized user is required.

When the OK button 534 is pressed, the Web browser 31 transmits a request to issue a PIN code to the service providing system 70 including the organization code and the authorized user addresses that are input through the login screen page 520. When a response destination address is input to the response destination address designation screen page 530, the request to issue a PIN code also includes the response destination address.

Next, the PIN code issuance part 726 in the service providing system 70 determines whether the same authorized user address as that included in the request to issue a PIN code is stored in the user information storage part 733 (S442). When the same authorized user address as that included in the request to issue a PIN code is not stored in the user information storage part 733 (NO in S442), the PIN code issuance part 726 does not issue a PIN code. In this case, a mail or a Web page indicating an error can be returned.

When the same authorized user address as that included in the request to issue a PIN code is stored in the user information storage part 733 (YES in S442), the PIN code issuance part 726 generates a PIN code (S443). The PIN code is associated with the organization code included in the request to issue a PIN code and the user name corresponding to the authorized user address included in the request to issue a PIN code and is managed by the PIN code management part 727. The user name corresponding to the authorized user address is the user name associated with the authorized user address in the user information storage part 733 and is stored there. The PIN code management part 727 uses, for example, a PIN code management table shown in FIG. 24 and manages correspondence information among organization codes, PIN codes and user names of authorized users.

FIG. 24 shows a configuration example of the PIN code management table. The PIN code management table stores PIN codes generated by the PIN code issuance part 726 in a manner of being associated with organization codes and user names of authorized users. The PIN code management table can be implemented by, for example, using a memory or an auxiliary storage device of the computer in which the PIN code management part 727 is implemented. Note that a plurality of mutually different PIN codes can be associated with the same organization code. This is because there is likelihood that PIN codes are designated to a plurality of users in the same organization (company).

Next, the PIN code management part 727 branches the process depending on whether a response destination address is designated in the request to issue a PIN code (S444). When a response destination address is designated (YES in S444), the PIN code management part 727 transmits an electronic mail including the generated PIN code to the response destination address (S445). When no response destination address is designated (NO in S444), the PIN code management part 727 returns a Web page displaying the generated PIN code to the Web browser 31 in a manner of including the Web page in a response to the request to issue a PIN code (S446).

In any case, the user can check the PIN code. The user can carry out login in the pattern 2 described in FIG. 20 using the PIN code.

Note that such a configuration can also be provided that instead of inputting an authorized user address to the response destination address designation screen page 530, authentication information of the authorized user such as the user name and the password, the user name or the like is input to the response destination address designation screen page 530. In this case, such a configuration can also be provided that, in response to a request to issue a PIN code, it is determined whether the same user name as the user name that is input is stored in the user information storage part 733 instead of the user name being determined from an authorized user address. Then, when the same user name as the user name that is input is stored in the user information storage part 733, a PIN code is issued.

Next, procedures concerning some scenarios included in the procedures described above using the flowcharts will be described using sequence diagrams.

Figure 25:
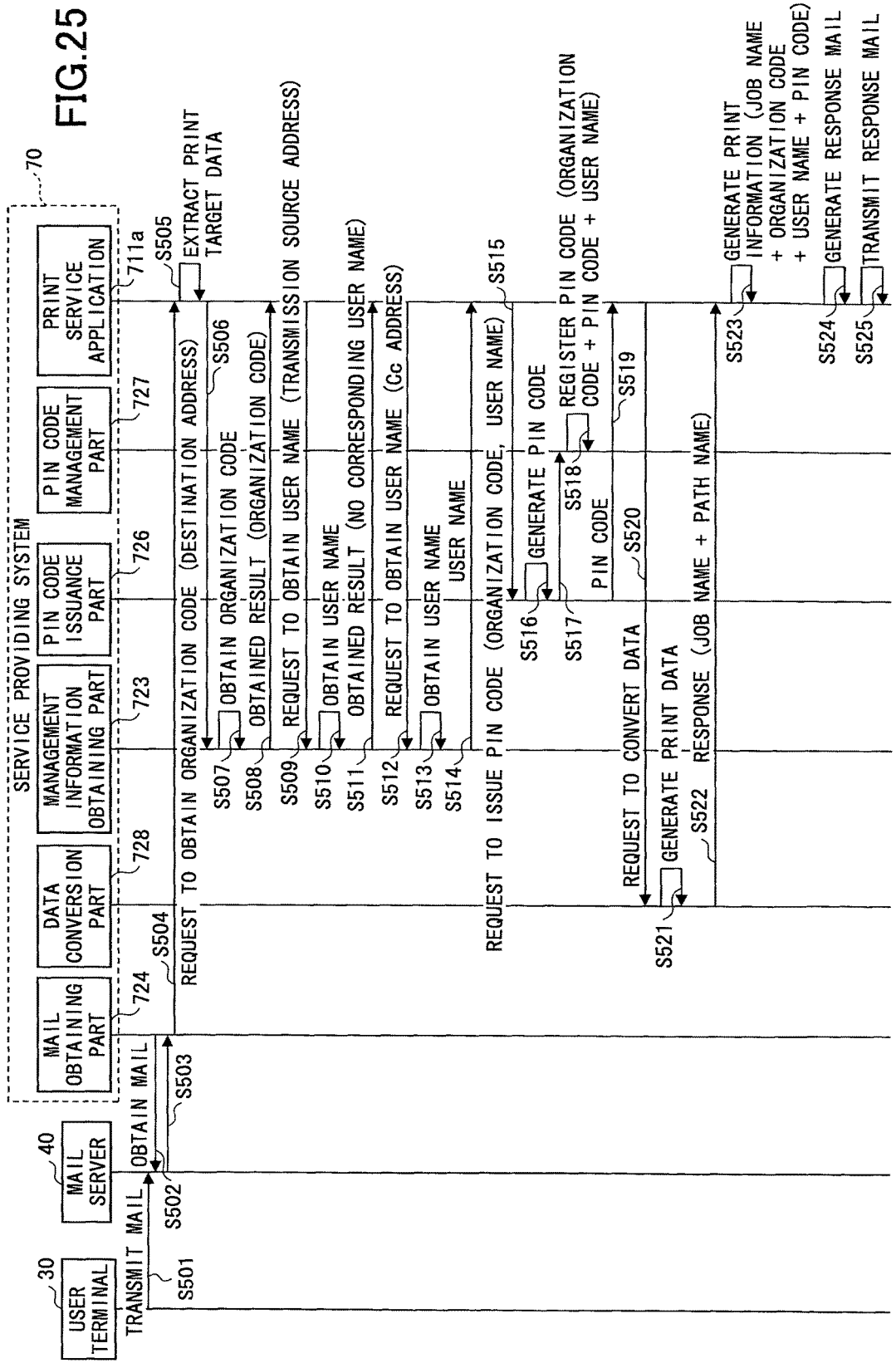
FIG. 25 is a sequence diagram illustrating one example of a procedure of registering print information and issuing a PIN code using a print request mail.

FIG. 25 is a sequence diagram illustrating one example of a procedure of registering print information and issuing a PIN code using a print request mail. That is, FIG. 25 is a sequence diagram illustrating a procedure in a case (a case of No in S405) in which no user name can be determined based on the transmission source address of a print request mail in the procedure of FIG. 18.

In step S501, the mail transmission part 32 in the user terminal 30 transmits a print request mail to the mail address assigned to the organization to which the user belongs. The print request mail is transferred according to, for example, Simple Mail Transfer Protocol (SMTP) to the mail server 40.

The mail obtaining part 724 in the service providing system 70 obtains the print request mail stored in the mail server 40 according to, for example, Post Office Protocol (POP) (S502, S503). The mail obtaining part 724 transfers the print request mail to the print service application 711a (S504). The mail analysis part 81 in the print service application 711a extracts the print target data from the print request mail (S505).

Next, the organization code determination part 82 in the print service application 711a requests the management information obtaining part 723 to obtain the organization code corresponding to the destination address of the print request mail (S506). The management information obtaining part 723 obtains the organization code associated with the destination address and stored in the address associated information storage part 731 (see FIG. 12) (S507), and returns the organization code (hereinafter, referred to as "target organization code") to the organization code determination part 82 (S508).

Next, the user name determination part 83 in the print service application 711a requests the management information obtaining part 723 to obtain the user name corresponding to the transmission source address of the print request mail (S509). The management information obtaining part 723 tries to obtain the user name associated with the transmission source address and stored in the user information storage part 733 (FIG. 19) (S510). Here, it is assumed that the corresponding user name cannot be obtained. Therefore, the management information obtaining part 723 returns a response indicating that the user name is not present to the user name determination part 83 (S511).

In response to the response indicating that the user name corresponding to the transmission source address is not present, the user name determination part 83 designates the Cc address of the print request mail and requests the management information obtaining part 723 to obtain the user name corresponding to the Cc address (S512). The management information obtaining part 723 tries to obtain the user name associated with the Cc address and stored in the user information storage part 733 (S513). Here, it is assumed that the corresponding user name can be obtained. Therefore, the management information obtaining part 723 returns a response including the corresponding user name to the user name determination part 83 (S514).

In response to the fact that the user name can be determined based on the Cc address, the user name determination part 83 designates the target organization code and the determined user name (hereinafter, referred to as "target user name") and requests the PIN code issuance part 726 to issue a PIN code (S515). The PIN code issuance part 726 generates a PIN code (S516) and transmits the PIN code and the target organization code to the PIN code management part 727 (S517). The PIN code management part 727 associates the target organization code, the PIN code and the target user name with each other and registers them in the PIN code management table (FIG. 24) (S518). The PIN code issuance part 726 returns a response including the PIN code to the user name determination part 83 (S519).

Next, the print information generation part 84 requests the data conversion part 728 to convert the print target data into print data (S520). The data conversion part 728 generates print data based on the print target data and stores the generated data in an auxiliary storage device (S521). Note that the data conversion part 728 assigns identification information (data ID) to the generated print data. According to the fourth embodiment, the data ID is used as a job name. Next, the data conversion part 728 returns a response including the job name and a path name of a file to which the print data is stored to the print information generation part 84 (S522).

The print information generation part 84 generates print information that includes the job name, the target organization code, the target user name, the PIN code and the path name of the file storing the print data (S523). Note that, for the above-mentioned configuration, it is described that print information includes print data. However, it is sufficient that print information includes information for making it possible to identify print data such as the path name of print data instead of the print data itself. Therefore, in the items of print data in FIG. 13, "the path name of print data" can be included.

Next, the response mail generation part 85 in the print service application 711a generates a response mail including the job name and the PIN code (S524). Next, the mail return part 86 transmits the response mail to the transmission source address of the print request mail (S525).

Figure 26:
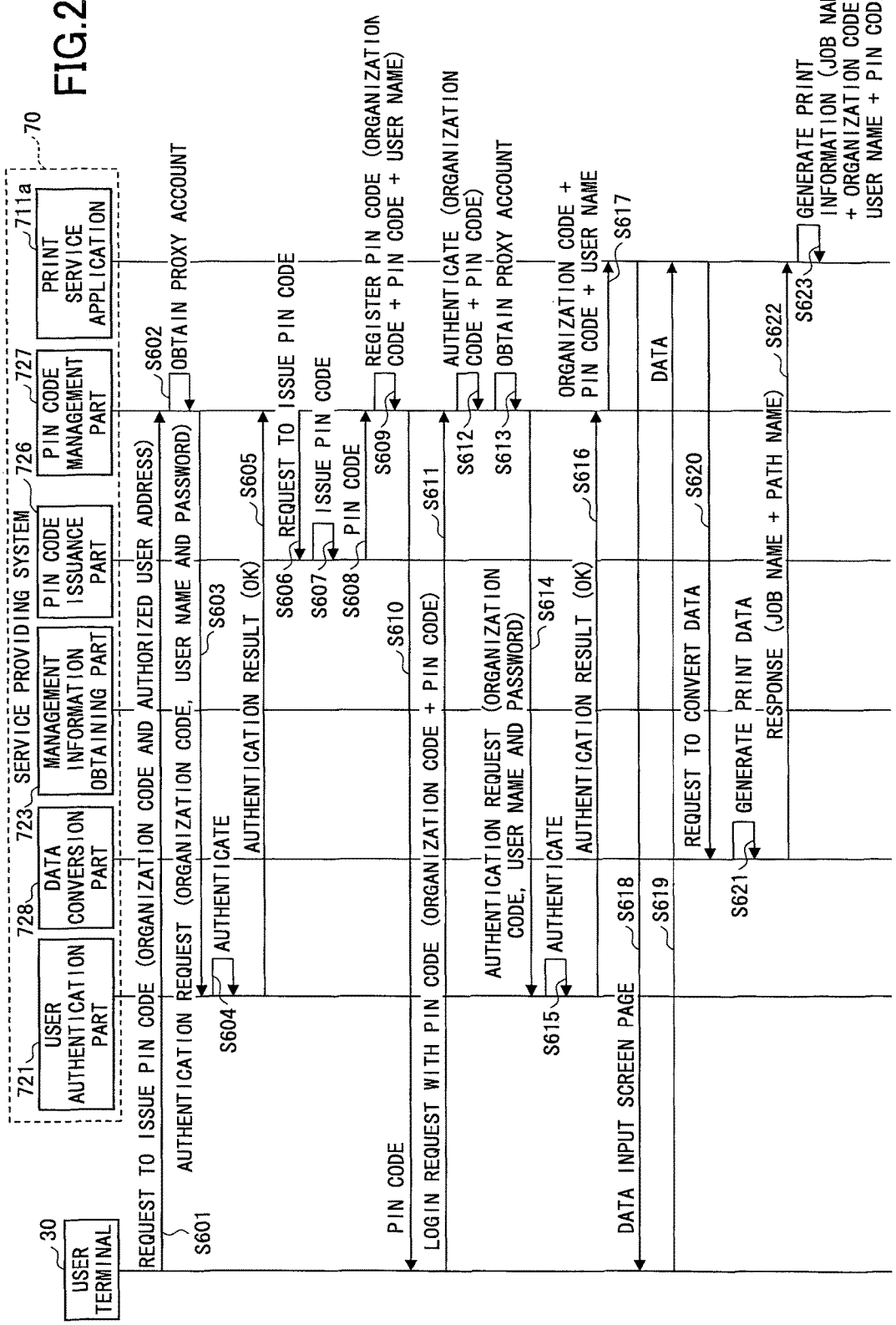
FIG. 26 is a sequence diagram illustrating one example of a procedure of issuing a PIN code and registering print information using the Web interface.

Next, FIG. 26 is a sequence diagram illustrating one example of a procedure of issuing a PIN code and registering print information using the Web interface. That is, FIG. 26 illustrates a procedure in case of having a PIN code issued through the procedure of FIG. 22, logging in by using an organization code and a PIN code in FIG. 20 and registering print information.

In step S601, in response to inputs carried out to the login screen page 520, the response destination address designation screen page 530 and so forth, the Web browser 31 in the user terminal 30 designates an organization code (target organization code) and an authorized user address and transmits a request to issue a PIN code to the service providing system 70.

In response to the request to issue a PIN code, the PIN code management part 727 obtains a proxy account from a proxy account management table (S602). A proxy account is used instead of a true account (the user name and the password) of a user. That is, there is likelihood that a user who requests issuance of a PIN code does not have an account. Therefore, the user cannot receive authentication by the user authentication part 721, and as a result, cannot log in to the service providing system 70. This is the reason why a proxy account is used.

FIG. 27 shows a configuration example of the proxy account management table. In FIG. 27, in the proxy account management table, user names and passwords are registered in a manner of being associated with organization codes. Therefore, in step S602, the user name and the password corresponding to the organization code (target organization code) designated in the request to issue a PIN code are obtained.

Note that the user name and the password of the administrator of each organization can be used as a proxy account.

Next, the PIN code management part 727 designates the target organization code, and the user name and the password of the proxy account, and transmits an authentication request to the user authentication part 721 (S603). The user authentication part 721 reads the user information storage part 733 with regard to the organization code, the user name and the password, and carries out authentication (S604). Next, the user authentication part 721 returns the authentication result to the PIN code management part 727 (S605).

When the authentication is successful, the PIN code management part 727 requests the PIN code issuance part 726 to issue a PIN code (S606). The PIN code issuance part 726 generates a PIN code (S607), and returns the PIN code to the PIN code management part 727 (S608). The PIN code management part 727 associates the target organization code, the PIN code and the user name corresponding to the authorized user address with each other and registers them in the PIN code management table (FIG. 24) (S609). The user name corresponding to an authorized user address can be determined by using the user information storage part 733.

Next, the PIN code management part 727 transmits a response including the PIN code to, for example, the user terminal 30 (S610). The form of the response can be an electronic mail or a Web page. In a case of an electronic mail, an electronic mail including the PIN code is transmitted to the response destination address designated in the request to issue a PIN code. Therefore, there is likelihood that the electronic mail is received by a terminal other than the user terminal 30.

The user who thus obtains the PIN code can log in to the service providing system 70 by using the PIN code. Then, the user inputs the organization code and the PIN code to the login screen page 520 (FIG. 21) displayed by the Web browser of the user terminal 30 and press the OK button 521. In response to the OK button 521 being pressed, the Web browser 31 transmits a login request by using the PIN code to the service providing system 70 (S611). In the login request, the organization code and the PIN code that are input to the login screen page 520 are designated. However, when the uniqueness of PIN codes straddling organizations is guaranteed, only a PIN code can be assigned. In this case, in the process that will be described below, information determined from a combination of an organization code and a PIN code can be determined only from a PIN code.

The PIN code management part 727 in the service providing system 70 authenticates the organization code and the PIN code designated in the login request (S612). Specifically, it is determined whether the same combination of the organization code and the PIN code is stored in the PIN code management table. When the same combination is stored in the PIN code management table, the authentication is successful. When the same combination is not stored in the PIN code management table, the authentication fails.

When the authentication of the PIN code is successful, authentication using the proxy account is carried out in the same procedure as steps S602 to S605 (S613 to S616). When the authentication is successful, login is successful. Then, the PIN code management part 727 notifies the print service application 711a of the organization code and the PIN code with which login is successful, and the user name (target user name) that is associated with the organization code and the PIN code and is stored in the PIN code management table (S617).

The print service application 711a returns a Web page for displaying a data input screen page to the user terminal 30 in a manner of including the Web page in a response to the login request using the PIN code (S618). The Web browser 31 in the user terminal 30 displays the data input screen page based on the Web page.

When a file is selected through the data input screen page displayed in the user terminal 30, the Web browser 31 transmits the data stored in the file to the print service application 711a (S619). Next, in the same procedure as steps S520 to S523 in FIG. 25, print data is generated for the thus transmitted data, and print information including the path name of the print data, the job name, the organization code, the target user name and the PIN code is stored in the print information storage part 734 (S620 to S623).

Figure 28:
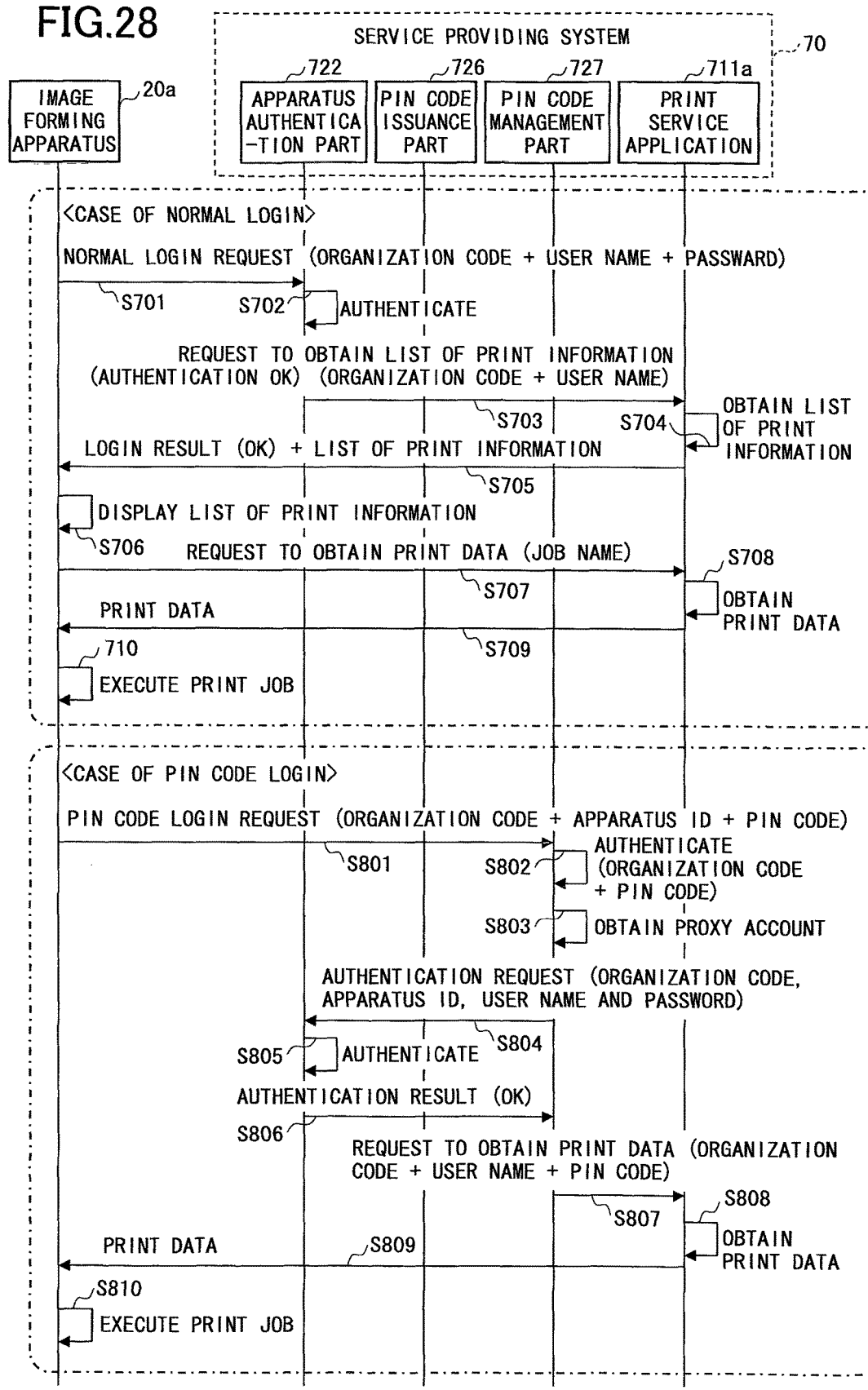
FIG. 28 is a sequence diagram illustrating one example of a procedure of outputting print data.

Next, FIG. 28 is a sequence diagram illustrating one example of a procedure of outputting print data. FIG. 28 shows a procedure for causing the image forming apparatus 20a to carry out a print job based on print data included in print information registered in the processes of FIG. 25 or 26.

In FIG. 28, steps S701 to S710 are a procedure carried out when a normal login (login based on an organization code, an apparatus ID, a user name and a password) is carried out from the image forming apparatus 20a. On the other hand, steps S801 to S810 are a procedure carried out when a login using a PIN code (login based on an organization code, an apparatus ID and a PIN code) is carried out from the image forming apparatus 20a.

A user name and a password are input to the login screen page 510 (FIG. 10) displayed on the operation panel 25 of the image forming apparatus 20a and the OK button 511 is pressed, the authentication control part 221 transmits a login request to the service providing system 70 (S701). In the login request, the organization code, the apparatus ID, the user name and the password are designated. The organization code and the apparatus ID can be previously stored in the HDD 214 of the image forming apparatus 20a. However, the organization code can be input through the login screen page 510. In this case, the login screen page 510 can have an input area for an organization code.

When the login request is received by the service providing system 70, the apparatus authentication part 722 carries out authentication (S702). Specifically, the authentication is successful when two conditions are satisfied. A first one of the two conditions is that the same combination of the organization code and the apparatus ID as the combination designated in the login request is stored in the user apparatus information storage part 732 (see FIG. 14). The second one of the two conditions is that the same combination of the organization code (hereinafter, referred to as "target organization code), the user name (hereinafter, referred to as "target user name") and the password as the combination designated in the login request is stored in the user information storage part 733 (see FIG. 19).

When the authentication is successful, the apparatus authentication part 722 designates the target organization code and the target user name and transmits a request to obtain a list of print information to the print service application 711a (S703). In the request to obtain a list of print information, the authentication result, the target organization code, the target user name and so forth are designated.

The print information providing part 87 in the print service application 711a obtains a list of print information including the target organization code and the target user name from the print information storage part 734 (S704). Note that, here, it is not necessary to obtain the substance of the print data. Next, the print information providing part 87 returns information indicating a successful login and the obtained list of print information (sets of print information) to the image forming apparatus 20a (S705).

The print information obtaining part 222 in the image forming apparatus 20a displays a list of the job names and so forth included in the returned respective sets of print information on the operation panel 25 (S706). When one or more job names are selected from among the list, the print information obtaining part 222 transmits a request to obtain the print data corresponding to the job names to the print service application 711a (S707). The print information providing part 87 in the print service application 711a reads the print information storage part 734 and obtains the print data associated with the job names designated in the request from the print information storage part 734 (S708). Next, the print information providing part 87 returns the print data to the image forming apparatus 20a (S709).

The print control part 223 in the image forming apparatus 20a controls execution of the print jobs concerning the print data (S710). As a result, sheets of paper on which the print data is printed are output. The billing destination for the cost concerning the print jobs can be determined based on, for example, the target user name.

Next, a case where a login using a PIN code is carried out will be described.

When a PIN code is input through the login screen page 510 (FIG. 10) displayed on the operation panel 25 of the image forming apparatus 20a and the OK button 511 is pressed, the authentication control part 221 transmits a login request to the service providing system 70 (S801). In the login request, the organization code, the apparatus ID and the PIN code are designated.

Next, the same processes as steps S612 to S616 of FIG. 26 are carried out (S802 to S806). Next, the PIN code management part 727 designates the organization code and the PIN code for which login is successful and the user name (hereinafter, referred to as "target user name") that is associated with the organization code and the PIN code and is stored in the PIN code management table, and transmits a request to obtain print data to the print service application 711a (S807).

Next, the print information providing part 87 in the print service application 711a reads the print information storage part 734 and obtains the print data associated with the organization code and the PIN code designated in the request to obtain print data from the print information storage part 734 (S808). Next, the print information providing part 87 returns the print data to the image forming apparatus 20a (S809).

The print control part 223 in the image forming apparatus 20a controls the print job concerning the print data (S810). As a result, sheets of paper on which the print data is printed are output. The billing destination for the cost concerning the print job can be determined based on, for example, the target user name.

Note that in FIG. 28, such an example has been described that in case of a login using a PIN code, a list of print information is not provided to the image forming apparatus 20a. This is because a user who logs in by using a PIN code is a guest user who temporarily uses the image forming apparatus 20a and there is high likelihood that the amount of registered print information is small. That is, there is high likelihood that a guest user wishes to print all of the registered print information. However, it is also possible that the same process as those of step S705 and the subsequent steps can be carried out even in case of a login using a PIN code. That is, a set of print information to be printed can be selected by a user from among the sets of print information associated with a PIN code designated in login.

Note that in the respective embodiments described above, the management server 10, the authentication server 50 and the storage server 60, or the service providing system 70 are/is one example of an information processing system. Print data is one example of output data. That is, each of the embodiments described above can also be applied to a case where data other than print data is output to an image forming apparatus or another apparatus. The mail reception part 11 and the mail obtaining part 724 are examples of an output data reception part. The address confirmation part 12 and the user name determination part 83 are examples of a determination part. A user name is one example of user identification information. A PIN code is one example of data identification information. That is, a PIN code is generated for each print request. Therefore, a PIN code can be said to be information for identifying data to be printed. The print information generation part 14 and the print information generation part 84 are examples of a storage process part. The mail return part 16 and the mail return part 86, or the PIN code management part 727 are/is one example (s) of a notification part. The print information providing part 63 and the print information providing part 87 examples of a transmission part. The user information storage part 52 and the user information storage part 733 are examples of a user information storage part. The print information storage part 62 and the print information storage part 734 are examples of a data storage part. A print request mail or print target data included in a print request mail is one example of mail data. The PIN code management table is one example of a data identification information storage part. The PIN code management part 727 is one example of a first reception part and a second reception part.

Although the information processing systems, the information processing methods and the non-transitory computer readable information recording mediums have been described with reference to the embodiments, the present invention is not limited to the embodiments, and variations and modifications exist within the scope and spirit of the invention as described and defined in the following claims.

The present Patent Application is based on Japanese Priority Application No. 2013-099971 filed May 10, 2013, the entire contents of which are hereby incorporated herein by reference.

PRIOR ART REFERENCES

Japanese Laid-Open Patent Application No. 2004-236348
Japanese Laid-Open Patent Application No. 2001-051915
The invention claimed is:
1. An information processing system which includes one or more information processing apparatuses, the information processing system comprising:
processing circuitry configured to
receive, via a network, mail data including output data or output target data;
determine user identification information to be associated with the received output data or output data generated based on the received output target data from user information stored by a user information storage by using address information of a sender of the mail data or address information included in transmission destinations of the mail data;
associate data identification information with the output data and store them in a data storage when the user identification information to be associated is determined from the address information included in the transmission destinations and not from the address information of the sender;
provide notification of the data identification information via the network; and
transmit, via the network, the output data associated with the user identification information or the data identification information received via the network.
2. The information processing system as claimed in claim 1, wherein the processing circuitry is configured to
store the data identification information in a data identification information storage,
receive, via the network, the data identification information, and associate the data identification information with the output data and store them in the data storage when the same data identification information as the data identification information is already stored in the data identification information storage.

3. The information processing system as claimed in claim 2, wherein
the user information is associated with first identification information associated with one or more users, and
the processing circuitry is configured to
store the user information in the user information storage, and
use address information of a destination of the received mail data to determine the first identification information and determine the user identification information from the user information associated with the determined first identification information.

4. The information processing system as claimed in claim 3, wherein the processing circuitry is configured to
receive the first identification information from a terminal via the network, and
provide notification of the data identification information when the same first identification information as the received first identification information is stored in the user information storage or when the processing circuitry uses the address information of the destination to determine the first identification information.

5. The information processing system as claimed in claim 1, wherein
the user information is associated with first identification information associated with one or more users, and
the processing circuitry is configured to
store the user information in the user information storage, and
use address information of a destination of the received mail data to determine the first identification information and determine the user identification information from the user information associated with the determined first identification information.

6. The information processing system as claimed in claim 5, wherein the processing circuitry is configured to
receive the first identification information from a terminal via the network, and
provide notification of the data identification information when the same first identification information as the received first identification information is stored in the user information storage or when the processing circuitry uses the address information of the destination to determine the first identification information.

7. An information processing method executed by an information processing system which includes one or more information processing apparatuses, the information processing method comprising:
receiving, via a network, mail data including output data or output target data;
determining user identification information to be associated with the received output data or output data generated based on the received output target data from user information stored by a user information storage by using address information of a sender of the mail data or address information included in transmission destinations of the mail data;
associating data identification information with the output data and storing them in a data storage when the user identification information to be associated is determined from the address information included in the transmission destinations and not from the address information of the sender;
providing notification of the data identification information via the network; and
transmitting, via the network, the output data associated with the user identification information or the data identification information received via the network.

8. The information processing method as claimed in claim 7, further comprising:
storing the data identification information in a data identification information storage;
receiving, via the network, the data identification information; and
associating the data identification information with the output data and storing them in the data storage when the same data identification information is already stored in the data identification information storage.

9. The information processing method as claimed in claim 8, wherein
the user information is associated with first identification information associated with one or more users, and
the method further comprises:
storing the user information in the user information storage, and
in the determining, using address information of a destination of the received mail data to determine the first identification information and the user identification information is determined from the user information associated with the determined first identification information.

10. The information processing method as claimed in claim 9, further comprising:
receiving the first identification information from a terminal via the network; and
providing notification of the data identification information when the same first identification information as the received first identification information is stored in the user information storage or when the, address information of the destination is used to determine the first identification information.

11. The information processing method as claimed in claim 7, wherein
the user information is associated with first identification information associated with one or more users, and
the method further comprises:
storing the user information in the user information storage, and
in the determining, using address information of a destination of the received mail data to determine the first identification information and the user identification information is determined from the user information associated with the determined first identification information.

12. The information processing method as claimed in claim 11, further comprising:
receiving the first identification information from a terminal via the network; and
providing notification of the data identification information when the same first identification information as the received first identification information is stored in the user information storage or when the address information of the destination is used to determine the first identification information.

13. A non-transitory computer readable information recording medium storing computer executable instructions that, when executed by a computer, cause the computer to execute a method comprising:

receiving, via a network, mail data including output data or output target data;

determining user identification information to be associated with the received output data or output data generated based on the received output target data from user information stored by a user information storage by using address information of a sender of the mail data or address information included in transmission destinations of the mail data;

associating data identification information with the output data and storing them in a data storage when the user identification information to be associated is determined from the address information included in the transmission destinations and not from the address information of the sender;

providing notification of the data identification information via the network; and transmitting, via the network, the output data associated with the user identification information or the data identification information received via the network.

14. The non-transitory computer readable information recording medium as claimed in claim 13, wherein the method further comprises:

storing the data identification information in a data identification information storage;

receiving, via the network, the data identification information; and associating the data identification information with the output data and storing them in the data storage when the same data identification information is already stored in the data identification information storage.

15. The non-transitory computer readable information recording medium as claimed in claim 14, wherein the user information is associated with first identification information associated with one or more users, and the method further comprises:

storing the user information in the user information storage, and in the determining, using address information of a destination of the received mail data to determine the first identification information and the user identification information is determined from the user information associated with the determined first identification information.

16. The non-transitory computer readable information recording medium as claimed in claim 15, wherein the method further comprises:

receiving the first identification information from a terminal via the network; and providing notification of the data identification information when the same first identification information as the received first identification information is stored in the user information storage or when the address information of the destination is used to determine the first identification information.

17. The non-transitory computer readable information recording medium as claimed in claim 13, wherein the user information is associated with first identification information associated with one or more users, and the method further comprises:

storing the user information in the user information storage, and in the determining, using address information of a destination of the received mail data to determine the first identification information and the user identification information is determined from the user information associated with the determined first identification information.

18. The non-transitory computer readable information recording medium as claimed in claim 17, wherein the method further comprises:

receiving the first identification information from a terminal via the network; and providing notification of the data identification information when the same first identification information as the received first identification information is stored in the user information storage or when the address information of the destination is used to determine the first identification information.

* * * * *